US012608435B2

(12) United States Patent　　(10) Patent No.:　US 12,608,435 B2
Cai et al.　　(45) Date of Patent:　　Apr. 21, 2026

(54) ACCESSING CONTENT VIA A LOGGED-OUT EXPERIENCE

(71) Applicant: Meta Platforms, Inc., Menlo Park, CA (US)

(72) Inventors: Conan Steven Cai, Fremont, CA (US); William Nicholas Camp, II, Mountain View, CA (US); Po Lung Chen, Santa Clara, CA (US); Nathan Christopher Cooper, Los Angeles, CA (US); Rafael Dahis, Foster City, CA (US); Alex Li, Redwood City, CA (US); Katsiaryna Mashokha, Fremont, CA (US); Bokyoung Park, Cupertino, CA (US); Sona Rathod, San Francisco, CA (US); Vivian Asia Reed Chern, Sunnyvale, CA (US); Harshavardhan Jayesh Shah, Fremont, CA (US); Rachel Sinon, Chicago, IL (US); Angelina Tjhung, Oakland, CA (US); Tyler Viet Truong, Brooklyn, NY (US); Jay Wadhwani, New York, NY (US); Marvin Williams, Los Angeles, CA (US); Qiuchen Zhai, Sunnyvale, CA (US); Qianyun Zhang, Fremont, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 121 days.

(21) Appl. No.: 18/511,564

(22) Filed: Nov. 16, 2023

(65) Prior Publication Data

US 2024/0311438 A1　　Sep. 19, 2024

(51) Int. Cl.
*G06F 16/958*　　(2019.01)
*G06Q 50/00*　　(2012.01)

(52) U.S. Cl.
CPC .......... *G06F 16/958* (2019.01); *G06Q 50/01* (2013.01)

(58) Field of Classification Search
None
See application file for complete search history.

(56) References Cited

U.S. PATENT DOCUMENTS 7,853,881 B1 * 12/2010 Aly Assal .............. G06Q 30/02
715/734
10,445,802 B1 * 10/2019 Adiseshan ......... G06Q 30/0621
(Continued)

FOREIGN PATENT DOCUMENTS

KR　　102064292 B1　　1/2020

OTHER PUBLICATIONS

"Instagram," retrieved from the Internet: URL: https://www.instagram.com/championsleague/?hl=en on May 11, 2022, 1 page.
(Continued)

*Primary Examiner* — Tuan S Nguyen
(74) *Attorney, Agent, or Firm* — EVERSHEDS SUTHERLAND (US) LLP

(57) ABSTRACT

Techniques for enabling users logged-out of a social networking system to access content associated with the social networking system are described. For example, based at least in part on determining a user is unassociated with a social networking system, the social networking system may present content to the user. In some examples, the amount of content available to the user may be limited, in which the user may be prompted to create an account. In some examples, logged-out users may be prompted to pick topics associated with their interests, allowing the social networking system to curate content for logged-out users.

19 Claims, 13 Drawing Sheets

(56) References Cited

U.S. PATENT DOCUMENTS

2007/0282950 A1 * 12/2007 Fischer .................. G06Q 10/10
709/204
2014/0229618 A1 * 8/2014 Kumar ................... G06Q 50/01
709/225
2019/0332650 A1 10/2019 Alon et al.

OTHER PUBLICATIONS

"TikTok," retrieved from the Internet: URL: https://www.tiktok.com/en/ on May 11, 2022, 4 pages.
"Twitter," retrieved from the Internet: URL: https://twitter.com on May 11, 2022, 7 pages.
International Search Report and Written Opinion for International Application No. PCT/US2024/054322, mailed Dec. 18, 2024, 15 pages.

* cited by examiner

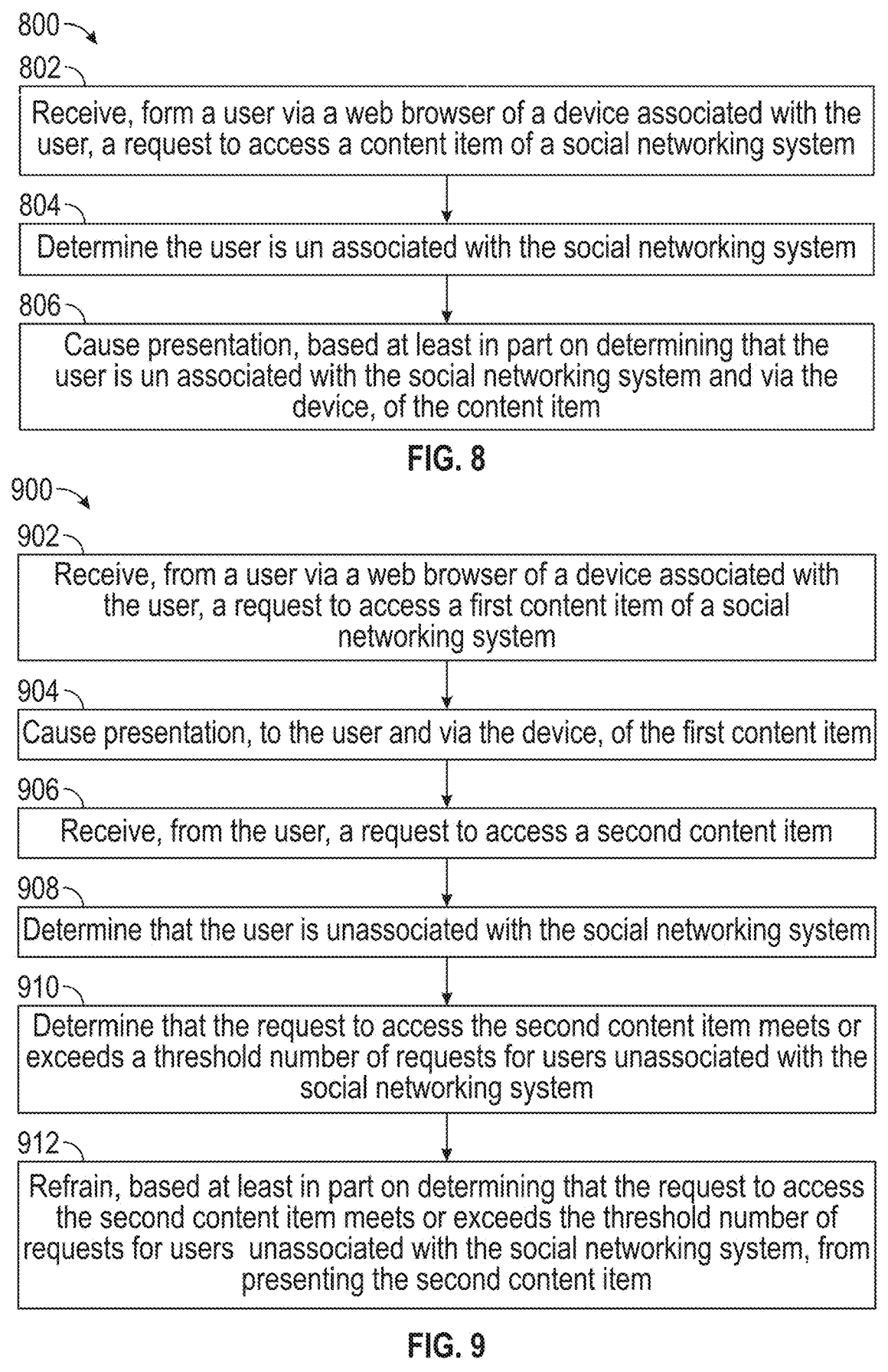

800 ⬋

802 ⬎

Receive, form a user via a web browser of a device associated with the user, a request to access a content item of a social networking system

804 ⬎

Determine the user is un associated with the social networking system

806 ⬎

Cause presentation, based at least in part on determining that the user is un associated with the social networking system and via the device, of the content item

Receive, from a user via a web browser of a device associated with the user, a request to access a first content item of a social networking system

904 ⬎

Cause presentation, to the user and via the device, of the first content item

906 ⬎

Receive, from the user, a request to access a second content item

908 ⬎

Determine that the user is unassociated with the social networking system

910 ⬎

Determine that the request to access the second content item meets or exceeds a threshold number of requests for users unassociated with the social networking system

912 ⬎

Refrain, based at least in part on determining that the request to access the second content item meets or exceeds the threshold number of requests for users unassociated with the social networking system, from presenting the second content item

FIG. 9

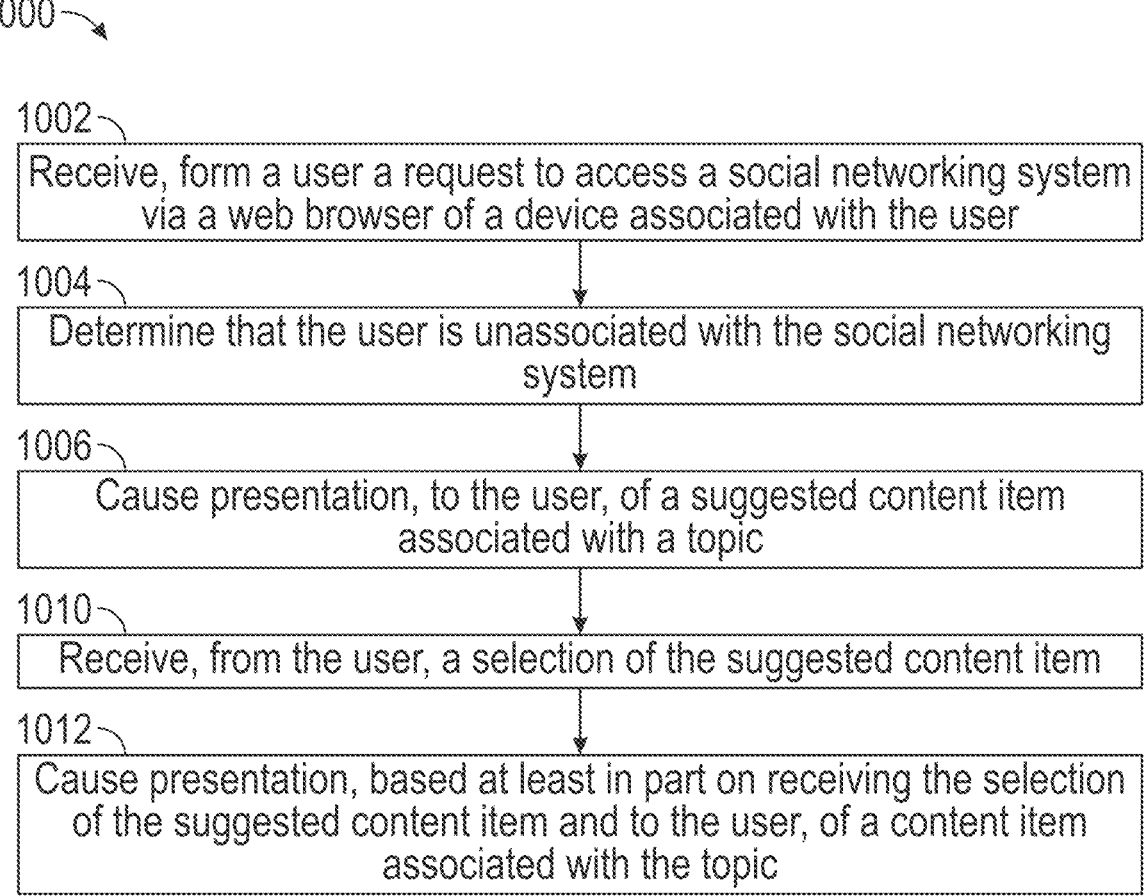

1000

1002

Receive, form a user a request to access a social networking system via a web browser of a device associated with the user

1004

Determine that the user is unassociated with the social networking system

1006

Cause presentation, to the user, of a suggested content item associated with a topic

1010

Receive, from the user, a selection of the suggested content item

1012

Cause presentation, based at least in part on receiving the selection of the suggested content item and to the user, of a content item associated with the topic

FIG. 10

ACCESSING CONTENT VIA A LOGGED-OUT EXPERIENCE

This application claims priority to U.S. provisional patent application Ser. No. 63/426,276, filed Nov. 17, 2022, which is incorporated herein by reference for all purposes.

BACKGROUND

Digital platforms such as text messaging, instant messaging, email, social media, gaming, or other applications by which users can share content provide users with numerous benefits and opportunities. For instance, users may create and share information, media, and other types of content with family, friends, colleagues, and even strangers. However, the freedom associated with creating and sharing content via these digital platforms is not without problems. Oftentimes, in order to access and interact with content, users must be logged-in to an existing account. As such, existing techniques allowing logged-out users or visitors of the digital platform to interact with content via digital platforms are limited.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 8 illustrates an example process for presenting content associated with a social networking system to a logged-out user.

FIG. 9 illustrates an example process for limiting content presented to a logged-out user via social networking system.

FIG. 10 illustrates an example process for determining content to present to a logged-out user.

DETAILED DESCRIPTION

Figure 1:
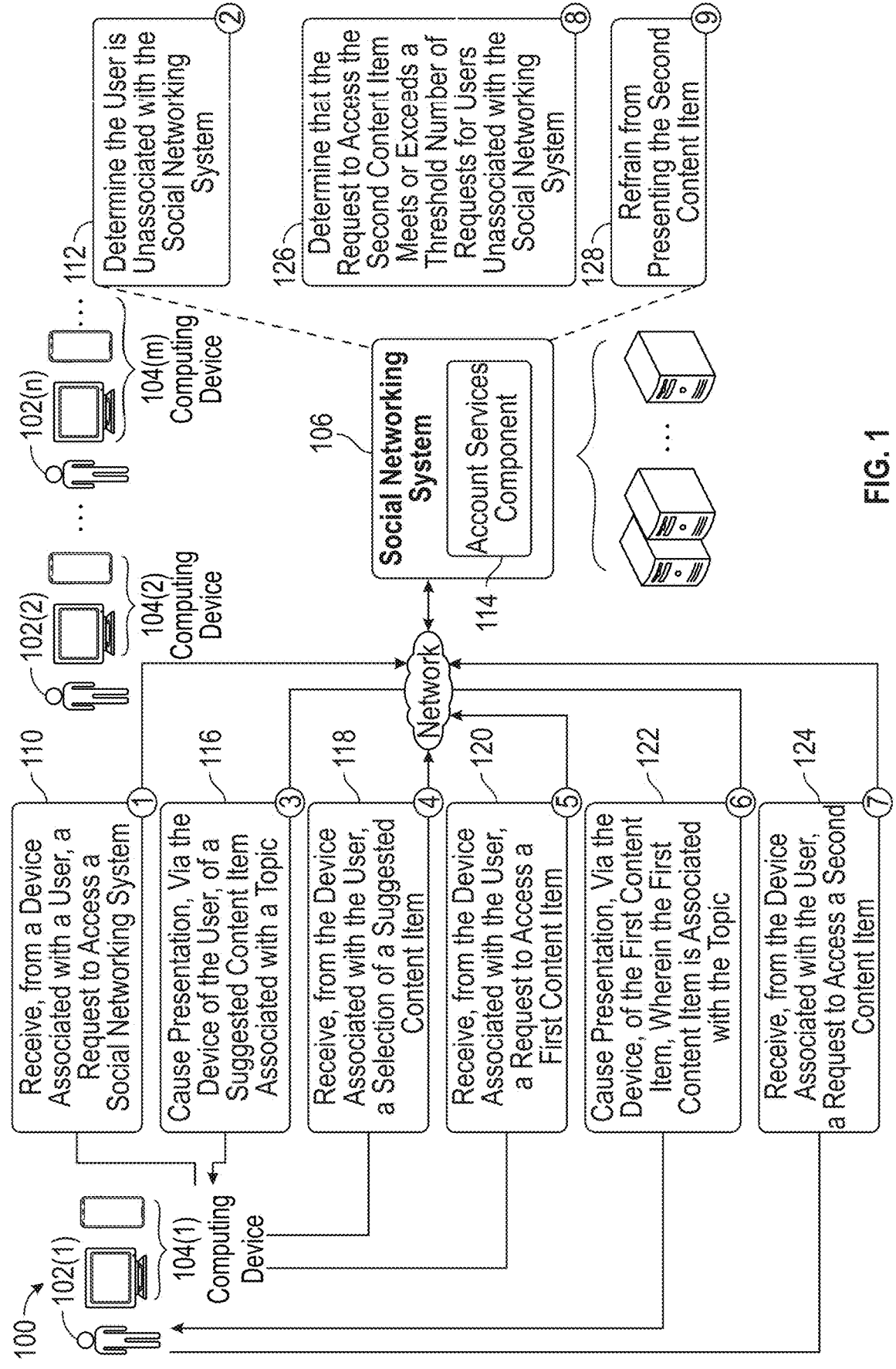
FIG. 1 is a schematic view of an example system usable to implement example techniques described herein.

As discussed above, the ability for logged-out users and/or visitors of digital platforms to access and interact with content may present challenges. For instance, many social network applications and/or services (herein referred to as "social networking systems") allow users to create, share, and interact with content. One way in which accounts may access content is via an application (herein referred to as "app") of a social networking system, in which users can create accounts and log into the app via their account. Another way is through a website associated with the social networking system, which may be accessed via a web browser. However, while users logged into social networking systems may have the ability to interact with content, logged-out users and/or visitors (e.g., users who are not logged into an existing account or who may not have yet created an account) typically have limited ability to access such content.

Existing options for logged-out users to access content via social networking systems, such as via a web-browser, have been inadequate. For instance, while the current techniques allow users to access websites and apps associated with social networking systems, these users are limited, if not prohibited, from viewing and interacting with content. In other words, existing techniques often require users to create and log into accounts associated with the social networking system before being able to access content.

This application describes techniques for logged-out users to access content via a social networking system. While the current application uses the term "logged-out," this is not intended to be limited to users logged-out of an existing account of a social networking system. Rather, it is intended to encompass users who may not yet have created an account via the social networking system, who may have an account via a different platform associated with the social networking system, or who may be using an account associated with a different social networking system, to name a few non-limiting examples. As such, these techniques allow logged-out users to interact with content associated with a social networking system prior to logging into an account associated with the social networking system and/or prior to creating an account associated with the social networking system, thus allowing logged-out users to explore features associated with the social networking system. For example, a logged-out user may be interested in creating an account via the social networking system but may not yet have created an account for any of a variety of reasons. By allowing logged-out users to access the social networking system prior to creating an account, potential users are afforded the ability to interact with the social networking system to determine that the user does indeed wish to create an account, prior to committing to generating an account.

While the social networking system may encourage users to create accounts on the social networking system by allowing users access to content, it may be desirable to place limits on the amount of content that users are allowed to consume before being prompted to create an account of their own. For example, while the social networking system may present content to logged-out users, the amount of content presented may be limited on factors such as an amount of content presented, an amount of time elapsed, or a type of content accessed, to name a few examples. Thus, while logged-out users may access content, this access may not be unlimited.

These and other aspects are described further below with reference to the accompanying drawings. The drawings are merely example implementations, and should not be construed to limit the scope of the claims. For example, while examples are illustrated in the context of a user interface for a mobile device, the techniques may be implemented using any computing device and the user interface may be adapted to the size, shape, and configuration of the particular computing device.

Moreover, while the techniques described herein are described with respect to accessing the social networking system via a web browser, the techniques are not intended to be so limiting, and may be applied to any medium in which the social networking system may be accessed, such as an application via a mobile device or a desktop computer.

Example System Architecture

FIG. 1 is a schematic view of an example computing system 100 usable to implement example techniques described herein to enable users not yet logged into an account via a platform of a social networking system the ability not only to access content associated with that social networking system prior to logging in and/or creating an account, but the ability to select topics of content that they may be interested in, allowing for a dynamic, curated experience. In some examples, the computing system 100 may include accounts that are associated with users 102(1), 102(2), . . . 102(n) (collectively "users 102") that interact using computing devices 104(1), 104(2), . . . 104(m) (collectively "computing devices 104") with a social networking system 106 via a network 108. In this example, n and m are non-zero integers greater than 1. Further, while the present specification refers to "users" as "logged-out" users, this term may be applied and used, in some examples, to describe logged-out visitors of the social networking system. In other words, the term "logged-out user" may include one or more individuals who have generated an account associated with the social networking system and who may not currently be logged into an existing account, and/or one or more individuals who have yet to create an account via the social networking system, for example.

Each of the computing devices 104 includes one or more processors and memory storing computer-executable instructions to implement the functionality discussed herein attributable to the various computing devices. In some examples, the computing devices 104 may include desktop computers, laptop computers, tablet computers, mobile devices (e.g., smart phones or other cellular or mobile phones, mobile gaming devices, portable media devices, etc.), wearable devices (e.g., augmented reality or virtual reality devices, glasses, watches, etc.), or other suitable computing devices. The computing devices 104 may execute one or more client applications, such as a web browser (e.g., Microsoft Windows Internet Explorer, Mozilla Firefox, Apple Safari, Google Chrome, Opera, etc.) or a native or special-purpose client application (e.g., social media applications, messaging applications, email applications, games, etc.), to access and view content over the network 108.

The network 108 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which the computing devices 104 may access the social networking system 106 and/or communicate with one another.

The social networking system 106 may include one or more servers or other computing devices, any or all of which may include one or more processors and memory storing computer-executable instructions to implement the functionality discussed herein attributable to the social networking system 106 or digital platform. The social networking system 106 may enable users (such as persons or organizations) 102 to interact with the social networking system 106 and with each other via the computing devices 104. The social networking system 106 may, with input from a user, create and store in the social networking system 106 a user account associated with the user. The user account may include demographic information, communication-channel information, financial information and information on personal interests of the user. The social networking system 106 may also, with input from a user, create and store a record of relationships of the user with other users of the social networking system 106, as well as provide services (e.g., posts, comments, photo-sharing, messaging, tagging, mentioning of other users or entities, games, etc.) to facilitate social interaction between or among the users 102.

In some examples, the social networking system 106 may be associated with multiple platforms. For example, the techniques described herein may be applied to any number of platforms associated with the social networking system 106 (i.e., a first platform, a second platform, etc.). A second platform, for example, may be administered by the same entity as the first platform or may be administered by separate/unrelated entities. For example, the user may have an account on two platforms offered by the same company, or two separate unrelated platforms offered by separate companies. The platforms may be of a same type (e.g., social networking platforms) or they may be different types (e.g., a social networking platform, a gaming platform, a merchant platform, etc.). In some examples, a user may use a single user account to access multiple separate platforms associated with the social networking system 106.

The social networking system 106 may be configured to allow logged-out users the ability to view and/or interact with content of the social networking system via an internet browser. For example, at operation 110 (indicated by "1"), the social networking system 106 may receive, from a device 104(1) associated with a first user 102(1) of the social networking system 106, a request to access the social networking system via a web browser. The social networking system 106 may receive the request as a scroll gesture, a swipe gesture, and/or a tap gesture, to name a few examples.

At operation 112 (indicated by a "2"), the social networking system 106 may determine that the first user 102(1) is unassociated with the social networking system 106. Additionally or alternatively, the social networking system 106 may determine that the device 104(1) is unassociated with the social networking system 106. For example, based at least in part on receiving the request, from the first user 102(1), the request to access the first platform of the social networking system, the account services component 114 of the social networking system 106 may send, to the device 104(1) of the first user 102(1), a request to access a token associated with login credentials of the first user 102(1) associated with the first platform. Based at least in part on refraining from receiving one or more tokens, the social networking system 106 may determine that the first user 102(1) is unassociated with an account on the first platform of the social networking system.

In some examples, the social networking system 106 may determine that the first user 102(1) has an account associated with the first platform, and thus may receive, from the device 104(1) associated with the first user 102(1), one or more tokens associated with login credentials of the first user 102(1) associated with the first platform of the social networking system 106. In such examples, the social networking system 106 may cause presentation, via the device 104(1), of one or more options associated with logging-into the account associated with the first user 102(1).

Additionally, or alternatively, the social networking system 106 may receive, from the device 104(1), one or more tokens associated with a second platform of the social networking system 106. In such examples, the social networking system 106 may cause presentation, via the device 104(1), of one or more options associated with creating an account on the first platform via the second platform. For example, the social networking system 106 may cause presentation of one or more options associated with logging into the account associated with the second platform. For example, upon logging into the second platform, the social networking system 106 may present, to the first user 102(1), an option to create an account on the first platform. Additionally or alternatively, in some examples, the social networking system 106 may cause presentation of one or more options associated with sharing data between the first platform and the second platform. For example, the social networking system 106 may present, to the first user 102(1), one or more options to allow the social networking system 106 to access data (e.g., cookies), associated with the account of the first user 102(1) on the second platform.

In some examples, the first user 102(1) may wish to experience what it may be like to have an account on the social networking system 106, but may not wish to commit to creating an account. Thus, in such examples, the social networking system 106 may cause presentation, via the device 104(1), of one or more options associated with creating a temporary account. A temporary account may be the same or similar to a traditional account of the social networking system 106, in that being logged-into the account may grant the user, such as the first user 102(1), access to content associated with the social networking system 106. However, in some examples, the temporary account may be associated with a period of time (e.g., 1 minute, 10 minutes, 1 hour, 10 hours, 1 day, 1 week, etc.) in which during the period of time the user may interact with the social networking system 106 via the temporary account. However, based at least in part on determining that the period of time has elapsed, the social networking system 106 may limit the user's ability to interact via the social networking system, such as by limiting content the user may view or accounts the user may interact with, for example.

In some cases, based at least in part on determining the period of time has elapsed, the social networking system 106 may cause presentation, via the device 104(1), of one or more options associated with generating a permanent account of the social networking system 106. A permanent account may be the same or similar to a traditional account of the social networking system 106, as described above. Based at least in part on receiving, via the device 104(1), an indication to generate a permanent account, the social networking system 106 may remove the period of time associated with the temporary account, thus transforming the temporary account to a permanent account, allowing the first user 102(1) to interact with the social networking system 106 via the permanent account indefinitely.

Alternatively, based at least in part on receiving, from the device 104(1), an indication to generate a permanent account, the social networking system 106 may generate a new, permanent account associated with the first user 102(1). In some examples, the social networking system 106 may send data associated with the temporary account to the permanent account. Based at least in part on generating the permanent account, the social networking system 106 may, in some examples, terminate the temporary account.

Although the first user 102(1) may be unassociated with the social networking system 106 (i.e., the first user 102(1) may not have an account associated with the first platform), the social networking system 106 may provide the first user 101(1) with one or more option to select interests of the first user 102(1), allowing the social networking system 106 an opportunity to gather information about first user's 102(1) preference. For example, at operation 116 (indicated by a "3"), the social networking system 106 may cause presentation, via the device 104(1), of a suggested content item.

Content, such as a content item, may take a variety of forms. For example, content may include a profile or feed post, a story, a direct message to one or more other accounts, a reel, a tweet, or a snap, to name a few examples. In general, a profile (or feed) post may include text and/or media content items, such as images, video, and/or audio. The profile post may be published to the social networking system 106 by an account, such as the users 102(1), for consumption by other users 102(2)-102(n), and may be viewable by the other accounts 102(2)-102(n) for as long as the first user 102(1) is active and/or until the post is deleted by the user 102(1), although examples are considered in which the profile post is removed and/or deleted after an amount of time (e.g., one hour, one day, one week, etc.). In some cases, a profile post shared by the user 102(1) may be included in respective content feeds of other the users 102(2)-102(n) of the social networking system 106 that have "followed" the first user 102(1), are "friends" with the account 102(1), are connections of the account 102(1) or are otherwise associated with the user 102(1).

A story may be similar to a profile post, in that the story may include text and/or media content items, such as images, video, and/or audio, is published to the social networking system 106 by the user 102(1) for consumption by the other users 102(2)-102(n), and may be included in a feed (although, in some cases, a separate feed from the profile post feed). However, a story may differ from a profile post in that the story may be shared only with a selected subset of the first user's 102(1) followers, and/or may be removed from being viewed by followers of the user 102(1) after a certain period of time (e.g., one hour, one day, one week, etc.). A direct message may also include text and/or media content items, such as images, video, and/or audio, but in general, a direct message is shared with a single other user 102(n) of the social networking system 106, or a selected subset of other users 102(2)-102(n) of the social networking system 106 rather than shared with all of an user's 102 followers.

In some examples, the content item may be associated with a topic. A topic may be an identifier associated with a content item that may assist the social networking system 106 in organizing and filtering data. For example, a topic may be a label describing the content. In some examples, topics may be a broad category encompassing a large portion of content. For example, a topic may be "people," "places," or "products," to name a few non-limiting examples. Additionally, topics may include one or more subtopics, which may include a category of a topic. For example, a "places" topic may include subtopics such as "tropical destination," "Europe," and "Washington State," to name a few examples. Similar to topics, subtopics may include any number of subtopics, which may further specify a category content may be associated with. For example, the subtopic "Europe" may include the subtopic "Paris," whereas the subtopic "Washington State" may further include the subtopic "Space Needle."

In some examples, a machine-learned model of the social networking system 106 may determine a topic associated with content. By way of example, the social networking system 106 may receive the instruction to determine that a content item is associated with a first topic from a machine-learned model of the social networking system 106. For instance, the social networking system 106 may input the content into the machine-learned model trained to determine a topic associated with the content. In some examples, the machine-learned model may build a mathematical model using training data that includes content that has been previously associated with a topic. For example, training data may include one or more content items that have been associated with one or more pre-determined topics, such as those defined above. Using the training data, the machine-learned model can be trained to label new content with existing topic labels as the content is received by the social networking system 106.

The machine-learned model may take a variety of forms. For instance, the machine-learned model may be a computer-vision classifier trained to analyze images and/or video (e.g., a frame and/or frames of a video) for images and/or videos that may be associated with one or more topics. The computer-vision classifier, in some examples, may be an artificial neural network trained to define a set of target topics from content (e.g., images, video, etc.) and determine one or more topics to be associated with new content as it is received by the social networking system 106 from one or more of the users 102. For example, the machine-learned model may receive the content from the first user 102(1) and using key images, output a score associated with one or more topics. The machine-learned model may compare the one or more scores, and based at least in part on determining, the highest score associated with a topic, associate that content with the topic with the highest score or potentially associate the content with multiple topics based on the scores (e.g., all scores above a threshold score).

Accordingly, the machine-learned model may include a number of additional or alternative classifiers to analyze the different content types of content received from the first user 102(1). For example, the machine-learned model may include an artificial neural network including a speech recognition classifier trained to analyze speech or other audio included in a video or audio recording to determine one or more topics associated with the video or audio. As another example, the machine-learned model may include a text classifier, such as an artificial neural network, trained to identify a topic associated with content. Further, the machine-learned model may include an optical character recognition (OCR) classifier, which when given an image representing printed text (e.g., in a GIF, sticker, characters traced onto a touch screen using a finger or stylus, etc.), determines the corresponding text. The OCR classifier may output the text to a text classifier trained to identify one or more topics, as described above.

The machine-learned model may take a variety of forms. For instance, the machine-learned model may be a computer-vision classifier trained to analyze images and/or video (e.g., a frame and/or frames of a video) for images and/or videos that may be associated with one or more topics. The computer-vision classifier, in some examples, may be an artificial neural network trained to analyze images. For example, the machine-learned model may receive one or more images from the first user 102(1) and using key images, output a score associated with a likelihood that the image should be used to generate a customized graphical element. The machine-learned model may compare the one or more scores, and based at least in part on determining, the highest score associated with an image, designate that image as an image as a desirable image for generating a customized graphical element.

Although specific machine-learned models are described above, other types of machine-learned models can additionally or alternatively be used. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

At operation 118 (indicated by a "4"), the social networking system 106 may receive, from the device 104(1), an indication of a selection of the suggested content item. For example, the social networking system 106 may cause presentation, via the device 104(1) associated with the first user 102(1), of a prompt associated with selecting the suggested content item. For example, the prompt may be an indication to the first user 102(1) that by selecting one or more suggested content items, the social networking system 106 may gather information about the first user's 102(1) preferences, likes, and/or dislikes, allowing the social networking system 106 to curate content to the first user 102(1). In other words, by allowing the social networking system 106 to learn preferences of the first user 102(1), the social networking system 106 may create a unique experience to the first user 102(1) by showing the first user 102(1) content the first user 102(1) is more likely to prefer.

In some examples, the social networking system 106 may cause presentation, via the device 104(1), of multiple suggested content items, of which the social networking system 106 may prompt the first user 102(1) to select one of the multiple suggested content items. In some examples, the multiple suggested content items may be associated with one or more different topics. For example, the social networking system 106 may cause presentation, via the device 104(1), of a first suggested content item, a second suggested content item, and a third suggested content item. The first suggested content item may be an image of a popular tourist destination (thus associated with a topic "travel"), the second content item may be an image of home décor (thus associated with a topic "home"), and the third suggested content item may be of a makeup tutorial (thus associated with a topic "beauty"). The social networking system 106 may cause presentation of a prompt via the device 104(1), wherein the prompt indicates, to the first user 102(1), to select preferences of the first user 102(1). This may include, for example, ranking the images, selecting the images the first user 102(1) likes, and/or selecting the images the first user 102(1) dislikes. In this way, the social networking system 106 may gain a better understanding of the likes and dislikes of the first user 102(1), without the ability to rely on past data collected from the first user 102(1).

At operation 120 (indicated by a "5"), the social networking system 106 may receive a request, from the device 104(1) associated with first user 102(1), a request to access a first content item of the social networking system 106. The social networking system 106 may receive the request via the device 104(1) associated with the first user 102(1) as a scroll gesture, a swipe gesture, and/or a tap gesture, to name a few examples.

At operation 122 (indicated by a "6"), the social networking system 106 may cause presentation, via the device 104(1), of the first content item. In some examples, the first content item may be associated with the topic. Continuing with the illustrative example above, the social networking system 106 may receive, from the first user 102(1) an indication of a selection of the suggested content item associated with "travel." Thus, the social networking system 106 may cause presentation, via the device 104(1), of an image of a tropical ocean (also associated with the topic "travel").

In some examples, while the social networking system 106 may encourage users to create accounts on the social networking system 106 by allowing users access to content, it may be desirable to place limits on the amount of content that users are allowed to consume before being prompted to create an account of their own. At operation 124 (indicated by a "7"), the social networking system 106 may receive, from the device 104(1), a request to access a second content item. Similar to that described above, the request may be received as a scroll gesture, a swipe gesture, and/or a tap gesture, to name a few examples.

At operation 126 (indicated by a "8"), the social networking system 106 may determine that the request to access the second content item meets or exceeds a threshold number of requests for the first user 102(1) unassociated with the social networking system 106. For example, the social networking system 106 may determine a threshold number of requests (e.g., 1 request, 5 requests, 10 requests, etc.) by the first user 102(1) to access the second content item. In some examples, the threshold may be a variable threshold which may be adjusted based on one or more characteristics associated with the user, the content, and/or the topic. The threshold may be set relatively higher for accounts that have not previously accessed the social networking system 106, or for topics that are not associated with unhealthy, unrealistic, or objectionable content. Conversely, in some examples, the threshold may be set relatively lower for accounts that have previously accessed the social networking system 106, and/ or for topics that are known to be associated with unhealthy, unrealistic, or objectionable content. Alternatively, in some examples, the social networking system 106 may determine that the threshold corresponds to a threshold number of requests for users unassociated with the social networking system 106 to access content, and/or for devices unassociated with the social networking system.

In some examples, the threshold number of requests may be based at least in part on a type of content, such as a profile post, a feed post, a reel, or a story, to name a few examples, wherein the first content item and the second content item include the same type of content. Thus, the social networking system may determine a threshold number of requests to access a type of content (e.g., 1 request to access a reel, 5 requests to access a reel, 10 requests to access a reek, etc.). Additionally, or alternatively, in some examples, the threshold number of requests may be associated with an amount of time. For example, the social networking system 106 may determine an amount of time (e.g., 1 minute, 10 minutes, 20 minutes, 1 hour, etc.), and determine that the request to access the second content meets or exceeds a threshold number of requests for content associated with the topic at or within the amount of time. In this way, the social networking system 106 may prompt users to create an account via the social networking system 106, allowing users 102(n) unlimited access to content.

At operation 128 (indicated by a "9"), based at least in part on determining that the request to access the second content item meets or exceeds the threshold number of requests for users unassociated with the social networking system 106, the social networking system 106 may refrain from presenting the second content item via the device 104(1). For example, the social networking system 106 may cause presentation, via the device 104(1) of one or more options associated with creating an account via the social networking system 106 such that the first user 102(1) may have full access to content associated with the social networking system.

In some examples, the social networking system 106 may provide privacy features to the user 102. In particular examples, one or more objects (e.g., content or other types of objects) of the computing system 100 may be associated with one or more privacy settings. The one or more objects may be stored on or otherwise associated with any suitable computing system or application, such as, for example, the social networking system 106, a client system, a third-party system, a social networking application, a messaging application, a photo-sharing application, or any other suitable computing system or application. Although the examples discussed herein are in the context of an online social network, these privacy settings may be applied to any other suitable computing system. Privacy settings (or "access settings") for an object or item of content may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular account or other entity to access that object, the object may be described as being "visible" with respect to that account or other entity. As an example, and not by way of limitation, an account of the social networking system 106 may specify privacy settings for a account-profile page that identify a set of accounts that may access work-experience information on the account-profile page, thus excluding other accounts from accessing that information.

In particular examples, privacy settings for an object may specify a "blocked list" and/or a "restricted list" of accounts or other entities that should not be allowed to access certain information associated with the object. In particular examples, the blocked list may include third-party entities. The blocked list or restricted list may specify one or more accounts or entities for which an object is not visible. As an example, and not by way of limitation, an account may specify a set of accounts who may not access photo albums associated with the account, thus excluding those accounts from accessing the photo albums (while also possibly allowing certain accounts not within the specified set of accounts to access the photo albums). In particular examples, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example, and not by way of limitation, a particular concept node corresponding to a particular photo may have a privacy setting specifying that the photo may be accessed only by accounts tagged in the photo and friends of the accounts tagged in the photo. In particular examples, privacy settings may allow accounts to opt in to or opt out of having their content, information, or actions stored/logged by the social networking system 106 or shared with other systems (e.g., a third-party system). Although this disclosure describes using particular privacy settings in a particular manner, this disclosure contemplates using any suitable privacy settings in any suitable manner.

In particular examples, privacy settings may be based on one or more nodes or edges of a social graph. A privacy setting may be specified for one or more edges or edge-types of the social graph, or with respect to one or more nodes or node-types of the social graph. The privacy settings applied to a particular edge connecting two nodes may control whether the relationship between the two entities corresponding to the nodes is visible to other accounts of the online social network. Similarly, the privacy settings applied to a particular node may control whether the account or concept corresponding to the node is visible to other accounts of the online social network. As an example, and not by way of limitation, the first user 102(1) may share an object to the social networking system 106. The object may be associated with a concept node connected to an account node of the first user 102(1) by an edge. The first user 102(1) may specify privacy settings that apply to a particular edge connecting to the concept node of the object or may specify privacy settings that apply to all edges connecting to the concept node. As another example and not by way of limitation, the first user 102(1) may share a set of objects of a particular object-type (e.g., a set of images). The first user 102(1) may specify privacy settings with respect to all objects associated with the first user 102(1) of that particular object-type as having a particular privacy setting (e.g., specifying that all images posted by the first user 102(1) are visible only to friends of the first user 102(1) and/or accounts tagged in the images).

In particular examples, the social networking system 106 may present a "privacy wizard" (e.g., within a webpage, a module, one or more dialog boxes, or any other suitable interface) to the first user 102(1) to assist the first user 102(1) in specifying one or more privacy settings. The privacy wizard may display instructions, suitable privacy-related information, current privacy settings, one or more input fields for accepting one or more inputs from the first user 102(1) specifying a change or confirmation of privacy settings, or any suitable combination thereof. In particular examples, the social networking system 106 may offer a "dashboard" functionality to the first user 102(1) that may display, to the first user 102(1), current privacy settings of the first user 102(1). The dashboard functionality may be displayed to the first user 102(1) at any appropriate time (e.g., following an input from the first user 102(1) summoning the dashboard functionality, following the occurrence of a particular event or trigger action). The dashboard functionality may allow the first user 102(1) to modify one or more of the first user 102(1)'s current privacy settings at any time, in any suitable manner (e.g., redirecting the first user 102(1) to the privacy wizard).

Privacy settings associated with an object may specify any suitable granularity of permitted access or denial of access, including the "restrict" functionality described herein. As an example and not by way of limitation, access or denial of access may be specified for particular accounts (e.g., only me, my roommates, my boss), accounts within a particular degree-of-separation (e.g., friends, friends-of-friends), account groups (e.g., the gaming club, my family), account networks (e.g., employees of particular employers, students or alumni of particular university), all accounts ("public"), no accounts ("private"), accounts of third-party systems, particular applications (e.g., third-party applications, external websites), other suitable entities, or any suitable combination thereof. Although this disclosure describes particular granularities of permitted access or denial of access, this disclosure contemplates any suitable granularities of permitted access or denial of access.

In particular examples, one or more servers may be authorization/privacy servers for enforcing privacy settings. In response to a request from an account (or other entity) for a particular object stored in a data store, the social networking system 106 may send a request to the data store for the object. The request may identify the account associated with the request and the object may be sent only to the account (or a client system of the account) if the authorization server determines that the account is authorized to access the object based on the privacy settings associated with the object. If the requesting account is not authorized to access the object, the authorization server may prevent the requested object from being retrieved from the data store or may prevent the requested object from being sent to the account. In the search-query context, an object may be provided as a search result only if the querying account is authorized to access the object, e.g., if the privacy settings for the object allow it to be surfaced to, discovered by, or otherwise visible to the querying account. In particular examples, an object may represent content that is visible to an account through a newsfeed of the account. As an example, and not by way of limitation, one or more objects may be visible to a account's "Trending" page. In particular examples, an object may correspond to a particular account. The object may be content associated with the particular account or may be the particular account's account or information stored on the social networking system 106, or other computing system. As an example, and not by way of limitation, a first user 102(1) may view one or more second accounts of an online social network through a "People You May Know" function of the online social network, or by viewing a list of friends of the first user 102(1). As an example, and not by way of limitation, a first user 102(1) may specify that they do not wish to see objects associated with a particular second account in their newsfeed or friends list. If the privacy settings for the object do not allow it to be surfaced to, discovered by, or visible to the account, the object may be excluded from the search results. Although this disclosure describes enforcing privacy settings in a particular manner, this disclosure contemplates enforcing privacy settings in any suitable manner.

In particular examples, different objects of the same type associated with an account may have different privacy settings. Different types of objects associated with an account may have different types of privacy settings. As an example, and not by way of limitation, a first user 102(1) may specify that the first user 102(1)'s status updates are public, but any images shared by the first user 102(1) are visible only to the first user 102(1)'s friends on the online social network. As another example and not by way of limitation, an account may specify different privacy settings for different types of entities, such as individual accounts, friends-of-friends, followers, account groups, or corporate entities. As another example and not by way of limitation, a first user 102(1) may specify a group of accounts that may view videos posted by the first user 102(1), while keeping the videos from being visible to the first user 102(1)'s employer. In particular examples, different privacy settings may be provided for different account groups or account demographics. As an example, and not by way of limitation, a first user 102(1) may specify that other account who attend the same university as the first user 102(1) may view the first user 102(1)'s pictures, but that other account who are family members of the first user 102(1) may not view those same pictures.

In particular examples, the social networking system 106 may provide one or more default privacy settings for each object of a particular object-type. A privacy setting for an object that is set to a default may be changed by an account associated with that object. As an example, and not by way of limitation, all images posted by a first user 102(1) may have a default privacy setting of being visible only to friends of the first user 102(1) and, for a particular image, the first user 102(1) may change the privacy setting for the image to be visible to friends and friends-of-friends.

In particular examples, privacy settings may allow a first user 102(1) to specify (e.g., by opting out, by not opting in) whether the social networking system 106 may receive, collect, log, or store particular objects or information associated with the account for any purpose. In particular examples, privacy settings may allow the first user 102(1) to specify whether particular applications or processes may access, store, or use particular objects or information associated with the account. The privacy settings may allow the first user 102(1) to opt in or opt out of having objects or information accessed, stored, or used by specific applications or processes. The social networking system 106 may access such information in order to provide a particular function or service to the first user 102(1), without the social networking system 106 having access to that information for any other purposes. Before accessing, storing, or using such objects or information, the social networking system 106 may prompt the account to provide privacy settings specifying which applications or processes, if any, may access, store, or use the object or information prior to allowing any such action. As an example, and not by way of limitation, a first user 102(1) may transmit a message to a second account via an application related to the online social network (e.g., a messaging app), and may specify privacy settings that such messages should not be stored by the social networking system 106.

In particular examples, an account may specify whether particular types of objects or information associated with the first user 102(1) may be accessed, stored, or used by the social networking system 106. As an example, and not by way of limitation, the first user 102(1) may specify that images sent by the first user 102(1) through the social networking system 106 may not be stored by the social networking system 106. As another example and not by way of limitation, a first user 102(1) may specify that messages sent from the first user 102(1) to a particular second account may not be stored by the social networking system 106. As yet another example and not by way of limitation, a first user 102(1) may specify that all objects sent via a particular application may be saved by the social networking system 106.

In particular examples, privacy settings may allow a first user 102(1) to specify whether particular objects or information associated with the first user 102(1) may be accessed from particular client systems or third-party systems. The privacy settings may allow the first user 102(1) to opt in or opt out of having objects or information accessed from a particular device (e.g., the phone book on an account's smart phone), from a particular application (e.g., a messaging app), or from a particular system (e.g., an email server). The social networking system 106 may provide default privacy settings with respect to each device, system, or application, and/or the first user 102(1) may be prompted to specify a particular privacy setting for each context. As an example, and not by way of limitation, the first user 102(1) may utilize a location-services feature of the social networking system 106 to provide recommendations for restaurants or other places in proximity to the account. The first user 102(1)'s default privacy settings may specify that the social networking system 106 may use location information provided from a client device of the first user 102(1) to provide the location-based services, but that the social networking system 106 may not store the location information of the first user 102(1) or provide it to any third-party system. The first user 102(1) may then update the privacy settings to allow location information to be used by a third-party image-sharing application in order to geo-tag photos.

Privacy Settings for Mood, Emotion, or Sentiment Information

In particular examples, privacy settings may allow an account to specify whether current, past, or projected mood, emotion, or sentiment information associated with the account may be determined, and whether particular applications or processes may access, store, or use such information. The privacy settings may allow accounts to opt in or opt out of having mood, emotion, or sentiment information accessed, stored, or used by specific applications or processes. The social networking system 106 may predict or determine a mood, emotion, or sentiment associated with an account based on, for example, inputs provided by the account and interactions with particular objects, such as pages or content viewed by the account, posts or other content uploaded by the account, and interactions with other content of the online social network. In particular examples, the social networking system 106 may use an account's previous activities and calculated moods, emotions, or sentiments to determine a present mood, emotion, or sentiment. An account who wishes to enable this functionality may indicate in their privacy settings that they opt into the social networking system 106 receiving the inputs necessary to determine the mood, emotion, or sentiment. As an example, and not by way of limitation, the social networking system 106 may determine that a default privacy setting is to not receive any information necessary for determining mood, emotion, or sentiment until there is an express indication from an account that the social networking system 106 may do so. By contrast, if an account does not opt in to the social networking system 106 receiving these inputs (or affirmatively opts out of the social networking system 106 receiving these inputs), the social networking system 106 may be prevented from receiving, collecting, logging, or storing these inputs or any information associated with these inputs. In particular examples, the social networking system 106 may use the predicted mood, emotion, or sentiment to provide recommendations or advertisements to the account. In particular examples, if an account desires to make use of this function for specific purposes or applications, additional privacy settings may be specified by the account to opt in to using the mood, emotion, or sentiment information for the specific purposes or applications. As an example, and not by way of limitation, the social networking system 106 may use the account's mood, emotion, or sentiment to provide news-feed items, pages, friends, or advertisements to an account. The account may specify in their privacy settings that the social networking system 106 may determine the account's mood, emotion, or sentiment. The account may then be asked to provide additional privacy settings to indicate the purposes for which the account's mood, emotion, or sentiment may be used. The account may indicate that the social networking system 106 may use his or her mood, emotion, or sentiment to provide newsfeed content and recommend pages, but not for recommending friends or advertisements. The social networking system 106 may then only provide newsfeed content or pages based on account mood, emotion, or sentiment, and may not use that information for any other purpose, even if not expressly prohibited by the privacy settings.

Privacy Settings for Ephemeral Sharing

In particular examples, privacy settings may allow an account to engage in the ephemeral sharing of objects on the online social network. Ephemeral sharing refers to the sharing of objects (e.g., posts, photos) or information for a finite period of time. Access or denial of access to the objects or information may be specified by time or date. As an example, and not by way of limitation, an account may specify that a particular image uploaded by the account is visible to the account's friends for the next week, after which time the image may no longer be accessible to other accounts. As another example and not by way of limitation, a company may post content related to a product release ahead of the official launch and specify that the content may not be visible to other accounts until after the product launch.

In particular examples, for particular objects or information having privacy settings specifying that they are ephemeral, the social networking system 106 may be restricted in its access, storage, or use of the objects or information. The social networking system 106 may temporarily access, store, or use these particular objects or information in order to facilitate particular actions of an account associated with the objects or information, and may subsequently delete the objects or information, as specified by the respective privacy settings. As an example, and not by way of limitation, a first user 102(1) may transmit a message to a second account, and the social networking system 106 may temporarily store the message in a data store until the second account has viewed or downloaded the message, at which point the social networking system 106 may delete the message from the data store. As another example and not by way of limitation, continuing with the prior example, the message may be stored for a specified period of time (e.g., 2 weeks), after which point the social networking system 106 may delete the message from the data store.

Privacy Settings for Account-Authentication and Experience-Personalization Information In particular examples, the social networking system 106 may have functionalities that may use, as inputs, personal or biometric information of a user associated with an account for user-authentication or experience-personalization purposes. An account may opt to make use of these functionalities to enhance their experience on the online social network. As an example, and not by way of limitation, an account may provide personal or biometric information to the social networking system 106. The account's privacy settings may specify that such information may be used only for particular processes, such as authentication, and further specify that such information may not be shared with any third-party system or used for other processes or applications associated with the social networking system 106. As another example and not by way of limitation, the social networking system 106 may provide a functionality for an account to provide voice-print recordings to the online social network. As an example, and not by way of limitation, if an account wishes to utilize this function of the online social network, the user associated with the account may provide a voice recording of his or her own voice to provide a status update on the online social network. The recording of the voice-input may be compared to a voice print of the user associated with the account to determine what words were spoken by the account. The account's privacy setting may specify that such voice recording may be used only for voice-input purposes (e.g., to authenticate the account, to send voice messages, to improve voice recognition in order to use voice-operated features of the online social network), and further specify that such voice recording may not be shared with any third-party system or used by other processes or applications associated with the social networking system 106. As another example and not by way of limitation, the social networking system 106 may provide a functionality for an account to provide a reference image (e.g., a facial profile, a retinal scan) to the online social network. The online social network may compare the reference image against a later-received image input (e.g., to authenticate the account, to tag the account in photos). The account's privacy setting may specify that such voice recording may be used only for a limited purpose (e.g., authentication, tagging the account in photos), and further specify that such voice recording may not be shared with any third-party system or used by other processes or applications associated with the social networking system 106.

Account-Initiated Changes to Privacy Settings

In particular examples, changes to privacy settings may take effect retroactively, affecting the visibility of objects and content shared prior to the change. As an example, and not by way of limitation, a first user 102(1) may share a first image and specify that the first image is to be public to all other accounts. At a later time, the first user 102(1) may specify that any images shared by the first user 102(1) should be made visible only to a group associated with the first user 102(1). The social networking system 106 may determine that this privacy setting also applies to the first image and make the first image visible only to the first user's 102(1) group. In particular examples, the change in privacy settings may take effect only going forward. Continuing the example above, if the first user 102(1) changes privacy settings and then shares a second image, the second image may be visible only to the first user's 102(1) group, but the first image may remain visible to all accounts. In particular examples, in response to an account action to change a privacy setting, the social networking system 106 may further prompt the account to indicate whether the account wants to apply the changes to the privacy setting retroactively. In particular examples, an account change to privacy settings may be a one-off change specific to one object. In particular examples, an account change to privacy may be a global change for all objects associated with the account.

In particular examples, the social networking system 106 may determine that a first user 102(1) may want to change one or more privacy settings in response to a trigger action associated with the first user 102(1). The trigger action may be any suitable action on the online social network. As an example, and not by way of limitation, a trigger action may be a change in the relationship between a first and second account of the online social network (e.g., "un-friending" an account, changing the relationship status between the accounts). In particular examples, upon determining that a trigger action has occurred, the social networking system 106 may prompt the first user 102(1) to change the privacy settings regarding the visibility of objects associated with the first user 102(1). The prompt may redirect the first user 102(1) to a workflow process for editing privacy settings with respect to one or more entities associated with the trigger action. The privacy settings associated with the first user 102(1) may be changed only in response to an explicit input from the first user 102(1) and may not be changed without the approval of the first user 102(1). As an example and not by way of limitation, the workflow process may include providing the first user 102(1) with the current privacy settings with respect to the second account or to a group of accounts (e.g., un-tagging the first user 102(1) or second account from particular objects, changing the visibility of particular objects with respect to the second account or group of accounts), and receiving an indication from the first user 102(1) to change the privacy settings based on any of the methods described herein, or to keep the existing privacy settings.

In particular examples, an account may need to provide verification of a privacy setting before allowing the account to perform particular actions on the online social network, or to provide verification before changing a particular privacy setting. When performing particular actions or changing a particular privacy setting, a prompt may be presented to the account to remind the account of his or her current privacy settings and to ask the account to verify the privacy settings with respect to the particular action. Furthermore, an account may need to provide confirmation, double-confirmation, authentication, or other suitable types of verification before proceeding with the particular action, and the action may not be complete until such verification is provided. As an example, and not by way of limitation, an account's default privacy settings may indicate that a person's relationship status is visible to all accounts (i.e., "public"). However, if the account changes his or her relationship status, the social networking system 106 may determine that such action may be sensitive and may prompt the account to confirm that his or her relationship status should remain public before proceeding. As another example and not by way of limitation, an account's privacy settings may specify that the account's posts are visible only to friends of the account. However, if the account changes the privacy setting for his or her posts to being public, the social networking system 106 may prompt the accounts with a reminder of the account's current privacy settings of posts being visible only to friends, and a warning that this change will make all of the account's past posts visible to the public. The account may then be required to provide a second verification, input authentication credentials, or provide other types of verification before proceeding with the change in privacy settings. In particular examples, an account may need to provide verification of a privacy setting on a periodic basis. A prompt or reminder may be periodically sent to the account based either on time elapsed or a number of account actions. As an example, and not by way of limitation, the social networking system 106 may send a reminder to the account to confirm his or her privacy settings every six months or after every ten photo posts. In particular examples, privacy settings may also allow accounts to control access to the objects or information on a per-request basis. As an example, and not by way of limitation, the social networking system 106 may notify the account whenever a third-party system attempts to access information associated with the account and require the account to provide verification that access should be allowed before proceeding.

Example User Interfaces

FIG. 2A-FIG. 7 are schematic views showing example user interfaces that are usable to implement the techniques described herein to enable logged-out users to access content associated with a social networking system. The interfaces and/or the notifications may be generated by a computing device of a social networking system (e.g., social networking system 106) and transmitted to one or more user computing devices (e.g., computing devices 104) for presentation, and/or the interfaces may be generated by the one or more user computing devices based at least in part on instructions received from the social networking system 106. As discussed above, the interfaces described in this section may, but need not, be implemented in the context of the computing system 100.

Figure 2B:
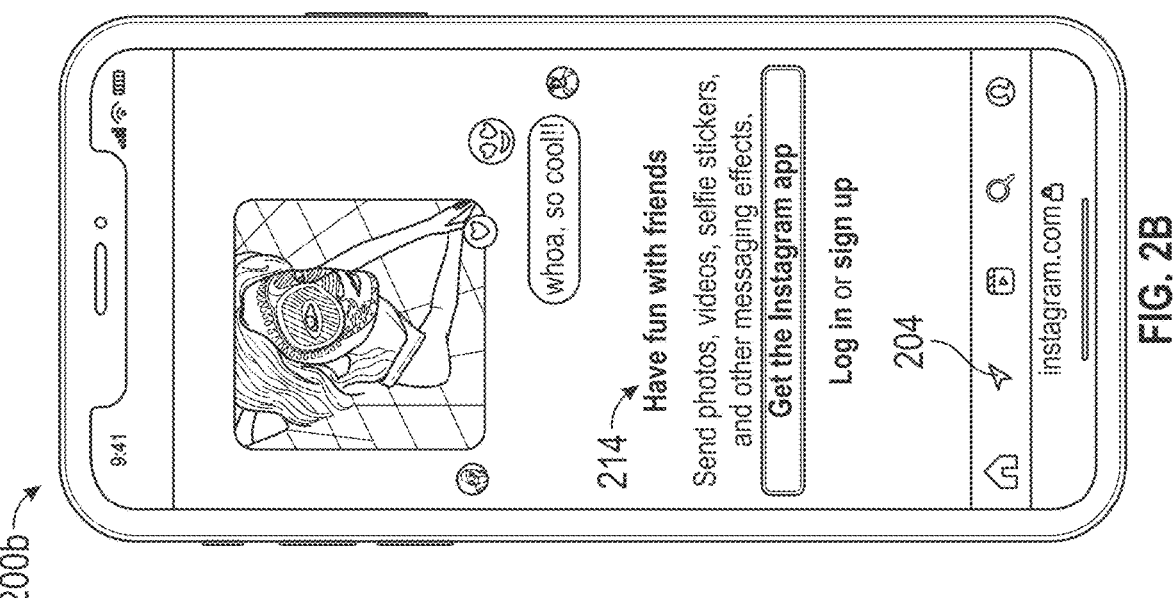
FIGS. 2A-2E illustrate example interfaces for accessing content associated with a social networking system.
Figure 2A:
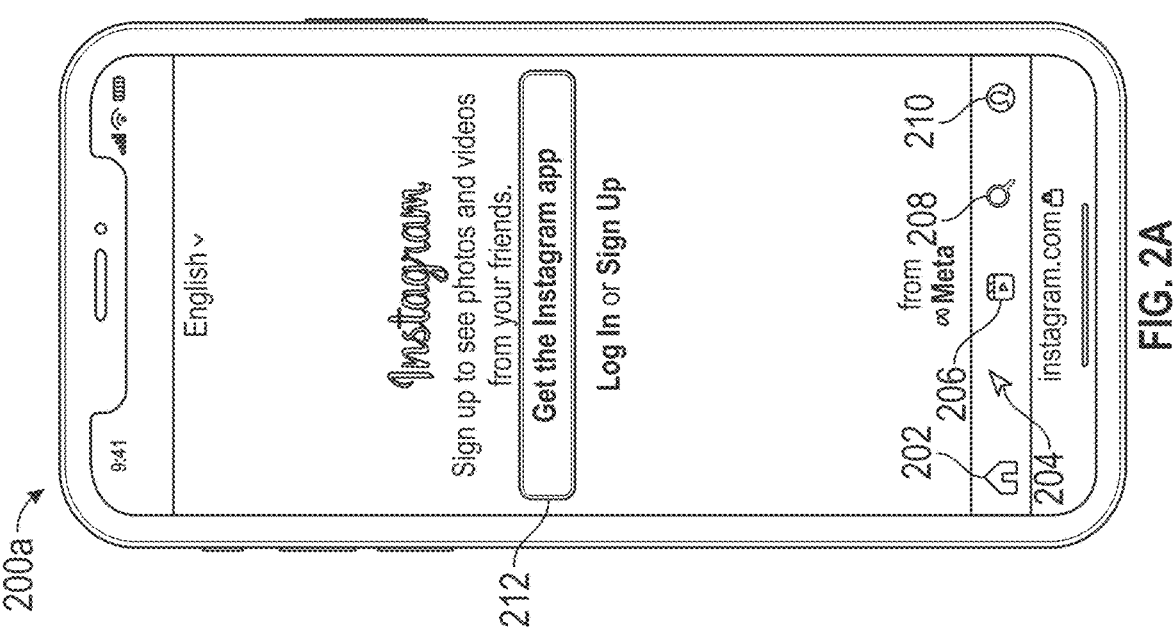

FIGS. 2A-2E illustrate example interfaces for accessing content associated with a social networking system. FIG. 2A illustrates example interface 200a which may be presented, via the device 104(1), an indication to access content via the social networking system 106. The interface 200a may be presented to the first user 102(1) based at least in part on the social networking system 106 receiving an indication of a selection of a selectable control 202. In some cases, the request to access the social networking system 106 may be received from a web browser associated with the device 104(1) of the first user 102(1), rather than, for example, an application. In some examples, social networking system 106 may cause presentation, via interface 200a and via the device 104(1), of one or more options associated with accessing content via the social networking system 106, such as sending content via messages (indicated by selectable control 204 and described with further detail in FIG. 3B), interacting with reels (indicated by selectable control 206 and described with further detail in FIGS. 2C and 3A-3D), discovering new content (indicated by selectable control 208 and described with further detail in FIGS. 2D, 5A, and 5B), and accessing a profile associated with the first user 102(1) and/or other users 102(2)-102(n) (indicated by selectable control 210 and described with further detail in FIGS. 6A-6D).

In some examples, the social networking system 106 may determine that the first user 102(1) is unassociated with the social networking system 106. In other words, the social networking system 106 may be unable to locate an account of the first user 102(1) associated with the social networking system 106. For example, based at least in part on receiving the request, from the first user 102(1), to access the social networking system, the account services component 114 of the social networking system 106 may send, to the device 104(1) of the first user 102(1), a request to access a token associated with login credentials of the first user 102(1) associated with the social networking system 106. Based at least in part on refraining from receiving one or more tokens, the social networking system 106 may determine that the first user 102(1) is unassociated with an account of the social networking system 106. Based at least in part on determining that the first user 102(1) is unassociated with the social networking system 106, the social networking system 106 may cause presentation, via the device 104(1), of one or more options 212 associated with generating an account associated with the social networking system 106. In some examples (not illustrated), the one or more options may include an option to create a temporary account.

FIG. 2B illustrates example interface 200*b* which may be presented to the first user 102(1) based at least in part on the social networking system 106 receiving, via the device 104(1), an indication of a selection of control 204. Similar to option 212, user interface 200*b* may include one or more selectable options associated with generating an account via the social networking system 106, such as option 214.

Figure 2D:
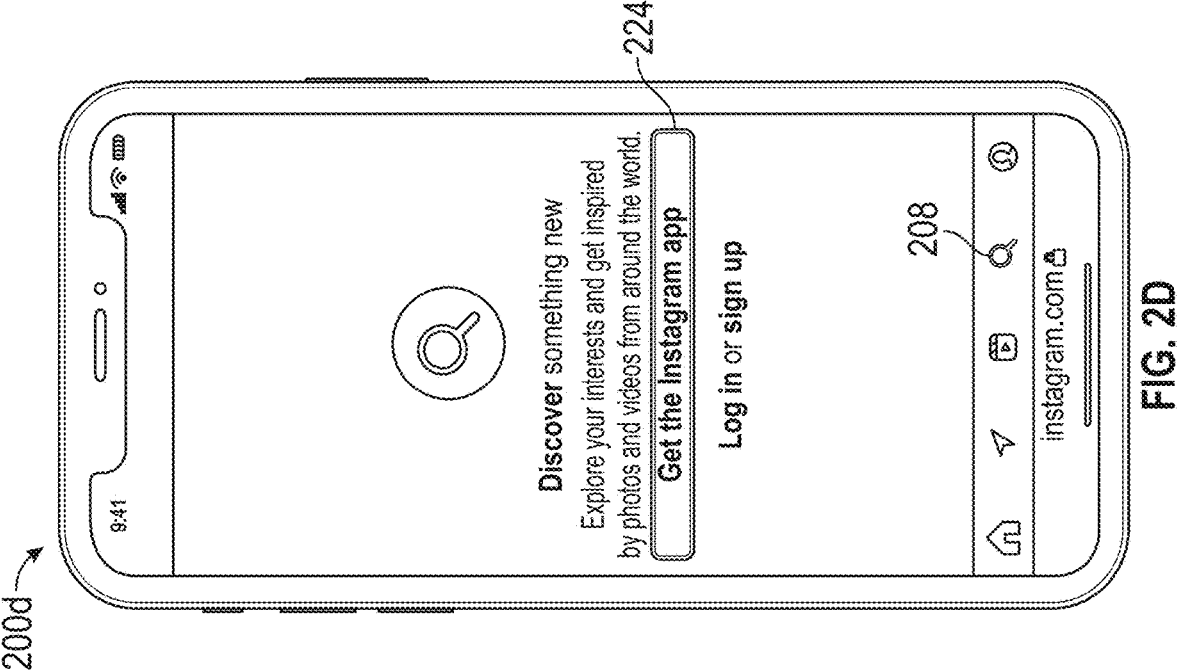
Figure 2C:
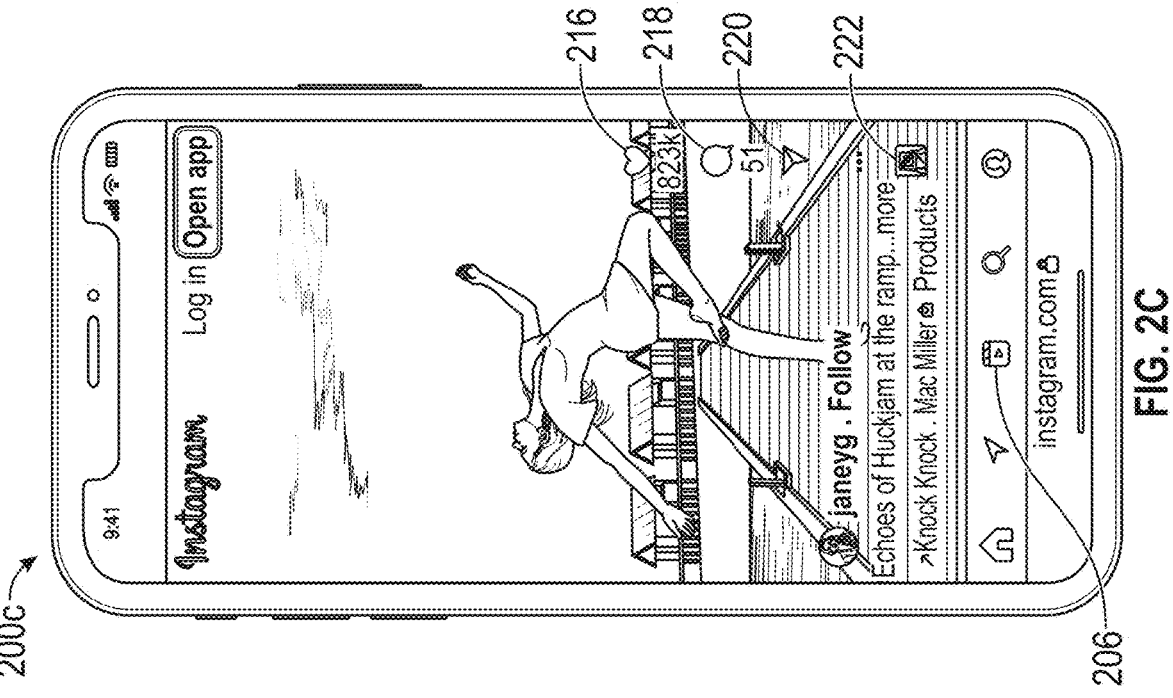

FIG. 2C illustrates an example interface 200*c* which may be presented to the first user 102(1) based at least in part on the social networking system 106, via the device 104(1), an indication of a selection of control 206. The interface 200*c* may include one or more selectable controls associated with interaction with content associated with the social networking system 106, such as liking content (selectable control 216), commenting on content (selectable control 218), sharing content (selectable control 220), and accessing audio associated with content (selectable control 222). Example interface 200*c* is described in more detail with regard to FIGS. 3A-3D, 4A, and 4B.

FIG. 2D illustrates example interface 200*d* which may be presented to the first user 102(1) based at least in part on the social networking system 106 receiving, via the device 104(1), an indication of a selection of control 208. Similar to option 212, user interface 200*b* may include one or more selectable options associated with generating an account via the social networking system 106, such as option 224.

Figure 2E:
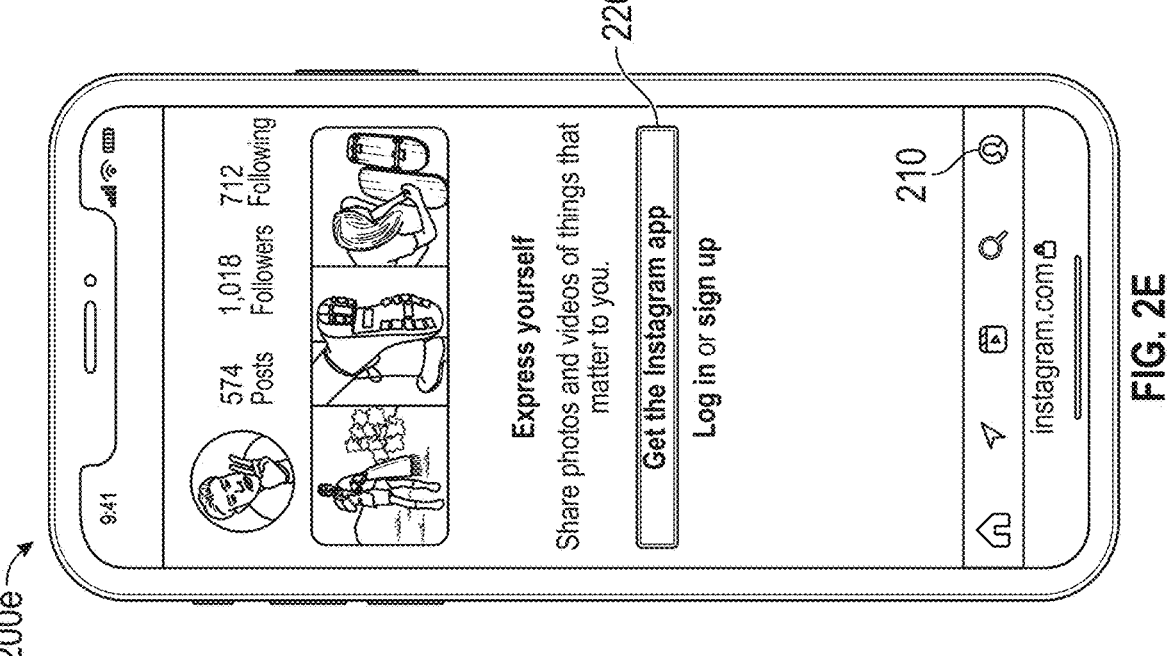

FIG. 2E illustrates example interface 200*e* which may be presented to the first user 102(1) based at least in part on the social networking system 106 receiving, via the device 104(1), an indication of a selection of control 210. Similar to option 212, user interface 200*b* may include one or more selectable options associated with generating an account via the social networking system 106, such as option 226.

FIGS. 3A-3D illustrate example interfaces for limiting content accessible to a logged-out user via a social networking system. In some examples, the social networking system 106 may permit users unassociated with the social networking system 106 to access content via the social networking system 106.

Figure 3A:
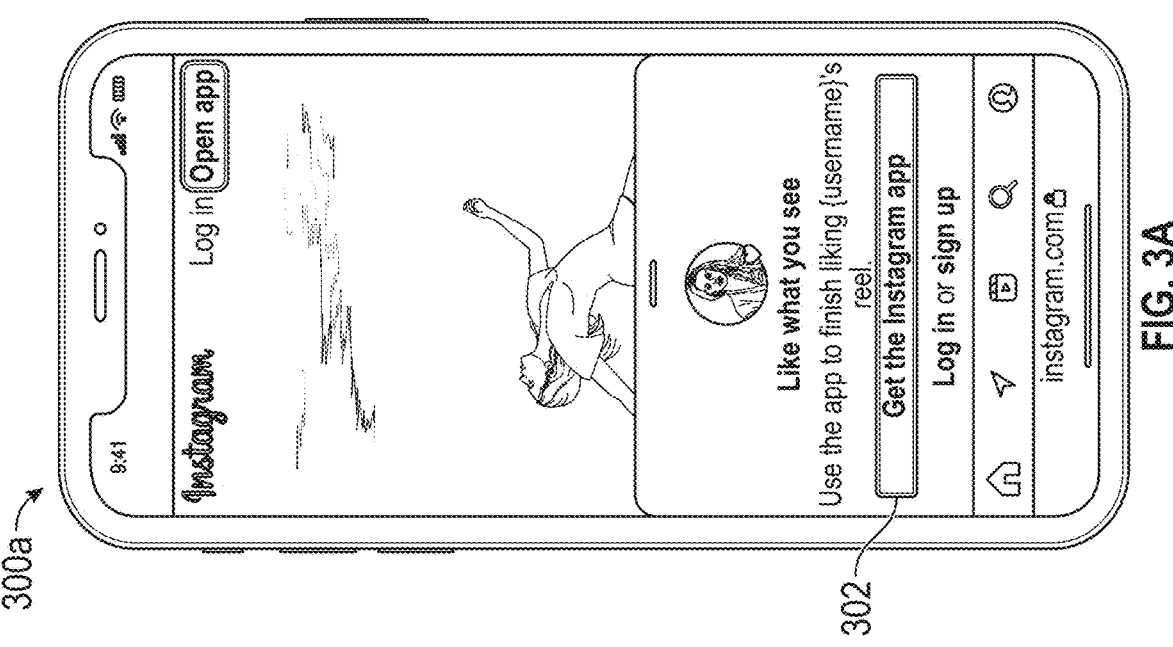
FIGS. 3A-3D illustrate example interfaces for limiting content accessible to a logged-out user via a social networking system.

For example, FIG. 3A illustrates example interface 300*a* which may be presented to the first user 102(1) based at least in part on the social networking system 106 receiving, via the device 104(1), an indication of a selection of control 216, illustrated in FIG. 2C. For example, based at least in part on receiving an indication of the selection of the control 216, the social networking system 106 may determine that the first user 102(1) is associated with the social networking system 106. The social networking system 106 may send, to the device 104(1) of the first user 102(1), a request to access one or more tokens associated with login credentials of the first user 102(1). Based at least in part on refraining from receiving one or more tokens, the social networking system 106 may determine that the first user 102(1) is unassociated with an account on the social networking system 106. For example, the first user 102(1) may be a user who has yet to create an account associated with the social networking system 106(1). Alternatively, the first user 102(1) may have an account associated with the social networking system but may be logged out of the account. In other examples, the first user 102(1) may be associated with an account via a platform of the social networking system 106 different than a platform of the social networking system 106 in which the first user 102(1) is currently interacting with. For example, the indication of the selection of the control 216 may be received on a first platform of the social networking system, wherein the social networking system may be associated with multiple platforms, such as a second platform.

Based at least in part on the social networking system 106 receiving, the device 104(1), an indication of a selection of control 216, the social networking system 106 may present, to the first user 102(1), one or more selectable options associated with generating and/or logging into an account via the social networking system 106, such as option 302.

Figure 3C:
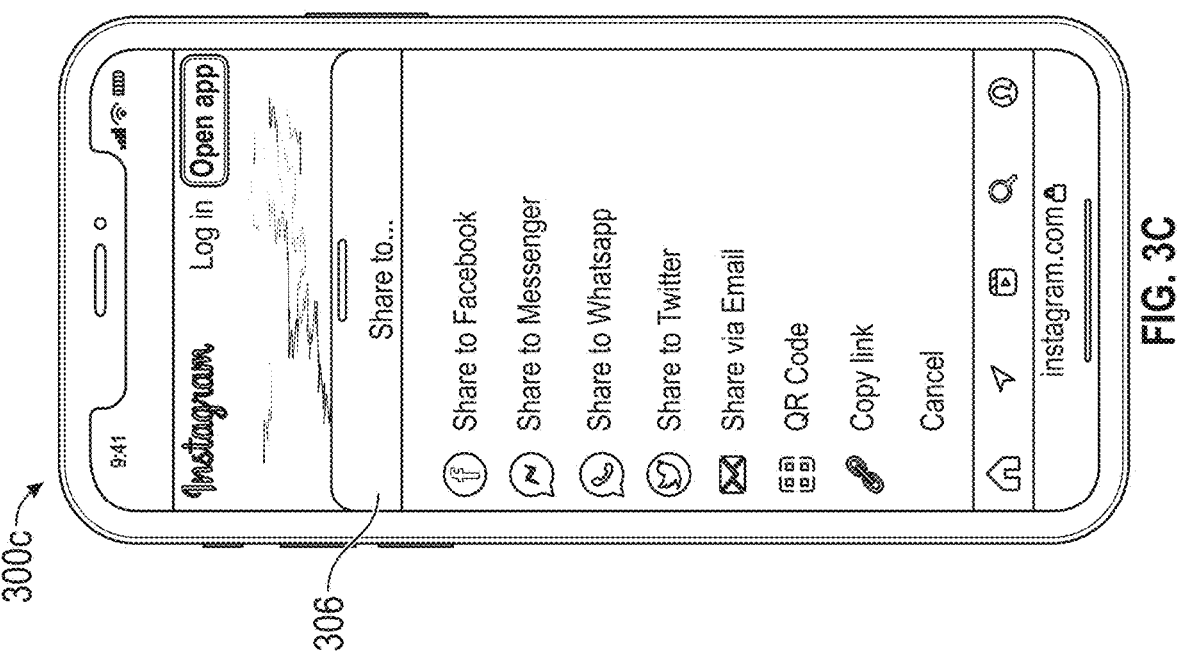
Figure 3B:
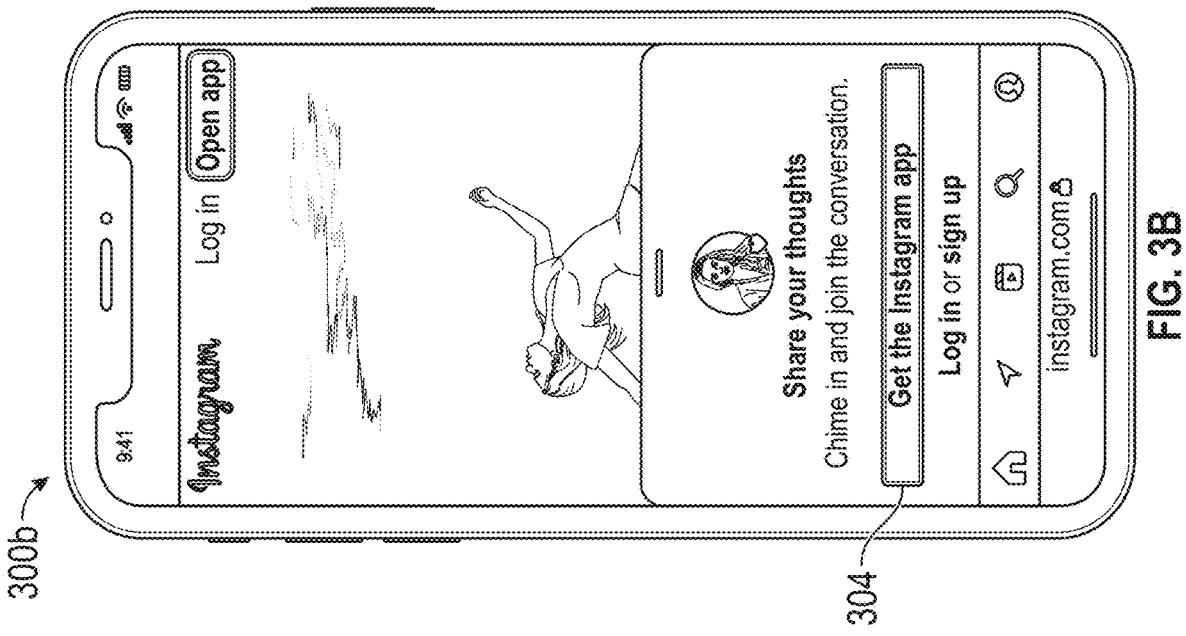

FIG. 3B illustrates an example interface 300*b* which may be presented to the first user 102(1) based at least in part on the social networking system 106 receiving, via the device 104(1), an indication of a selection of control 218. Similar to option 302, interface 300*b* may include one or more selectable options associated with generating and/or logging into an account via the social networking system 106, such as option 302.

FIG. 3C illustrates an example interface 300*c* which may be presented to the first user 102(1) based at least in part on the social networking system 106 receiving, via the device 104(1), an indication of a selection of control 220. The interface 300*c* may include an interface 306 associated with one or more selectable options associated with sharing content.

Figure 3D:
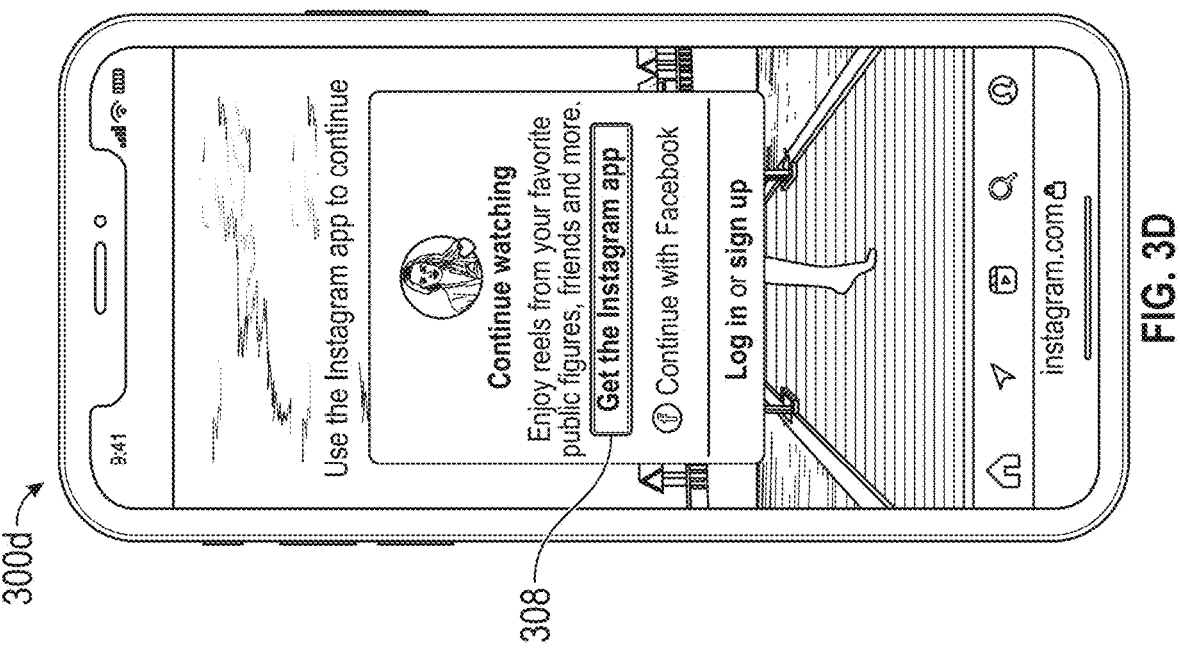

FIG. 3D illustrates an example interface 300*d* which may be presented to the first user 102(1) after the social networking system 106 has determined that a request by the first user 102(1) meets or exceeds a threshold number of requests to access content. For example, the social networking system 106 may receive, from the first user 102(1), a request to access a second content item. The social networking system 106 may threshold number of requests (e.g., 1 request, 5 requests, 10 requests, etc.) by the first user 102(1) to access the second content item. Based at least in part on determining that the request to access the second content item meets or exceeds the threshold number of requests for users unassociated with the social networking system 106, the social networking system 106 may refrain from presenting the second content item to the first user 102(1). For example, the social networking system 106 may cause presentation, via the device 104(1), of one or more options associated with creating an account via the social networking system 106 such that the first user 102(1) may have full access to content associated with the social networking system, such as option 308.

Figure 4A:
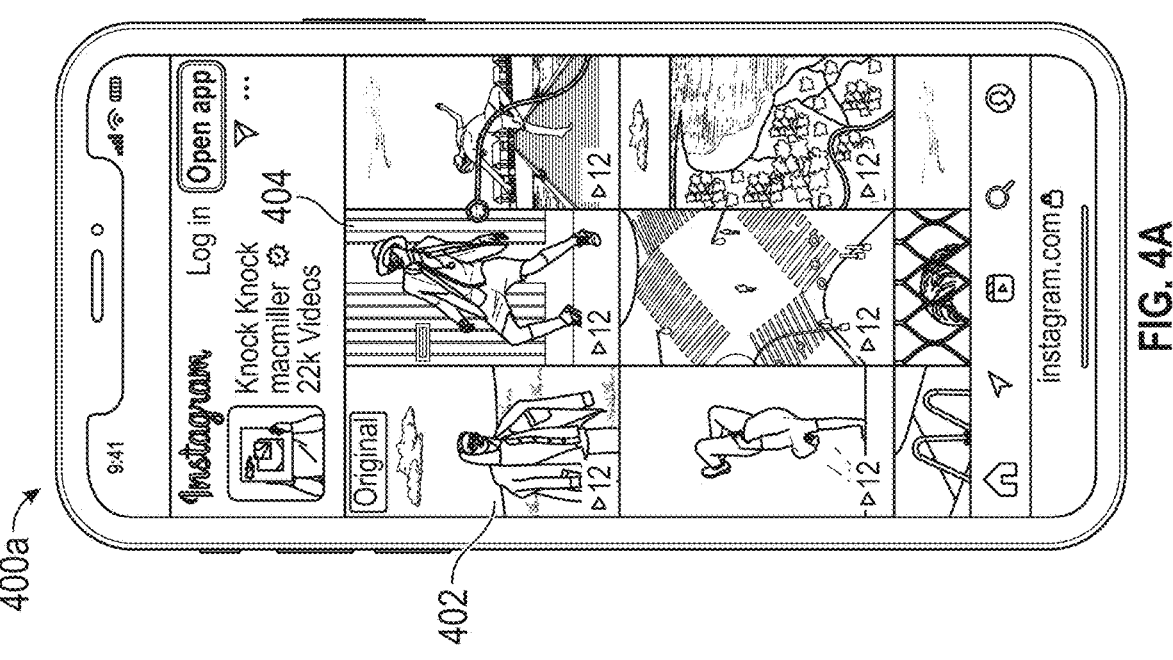
FIGS. 4A and 4B illustrate additional example interfaces for accessing content associated with a social networking system.
Figure 4B:
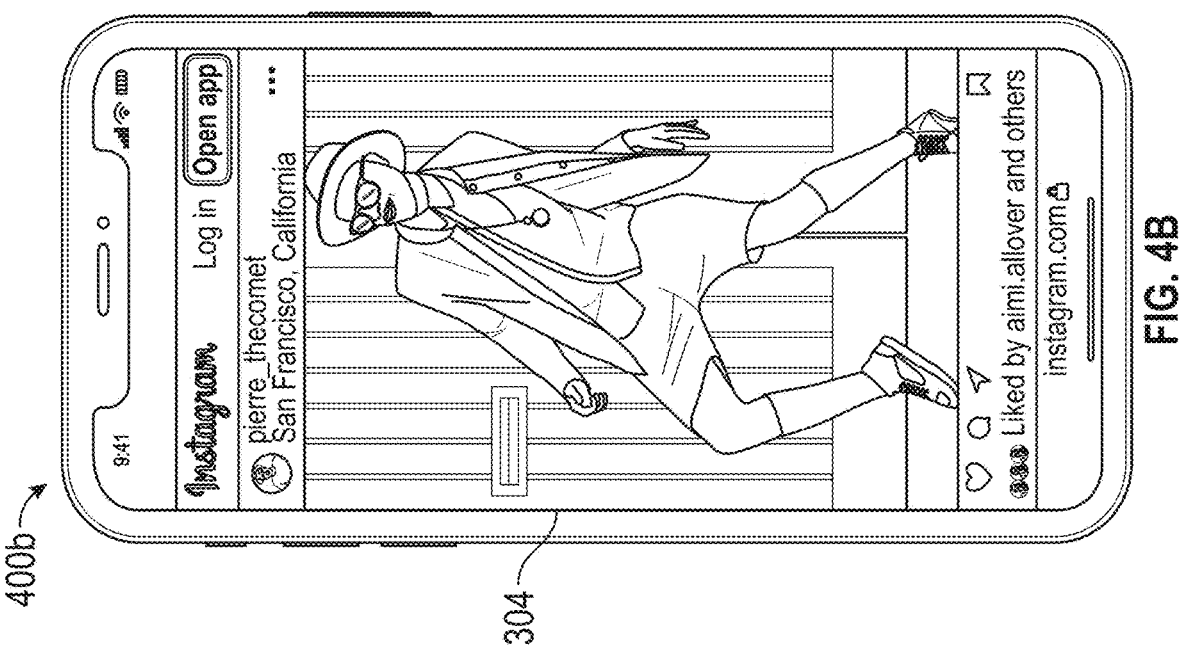

FIGS. 4A and 4B illustrate additional example interfaces for accessing content associated with a social networking system. In some examples, content may be associated with audio. For example, the content item illustrated in FIG. 3A-3D may include an audio clip, such as a song. The audio may be saved, shared, edited, and/or applied to other content.

FIG. 4A illustrates an example interface 400a usable to access audio associated with content. For example, based at least in part on receiving, via the device 104(1), an indication of a selection of the control 222, illustrated in FIG. 2C, the social networking system 106 may cause presentation, via the device 104(1), of the interface 400a. In some examples, the interface 400a may include one or more additional content items. For example, item 402 may be a content item including the original audio source. In some examples, the interface 400a may include additional or alternative content items associated with the audio, such as item 404.

In some examples, the content items associated with the interface 400a may be selectable such that upon a selection by a user 102(n), the social networking system 106 may cause presentation of the content item, such as in a profile of a user, a content feed, a discover feed, and/or a reels feed, to name a few examples. For example, FIG. 4B illustrates example interface 400b which may be presented via the device 104(1), based at least in part on the social networking system 106 receiving, via the device 104(1), an indication of a selection of the item 404.

Figure 5A:
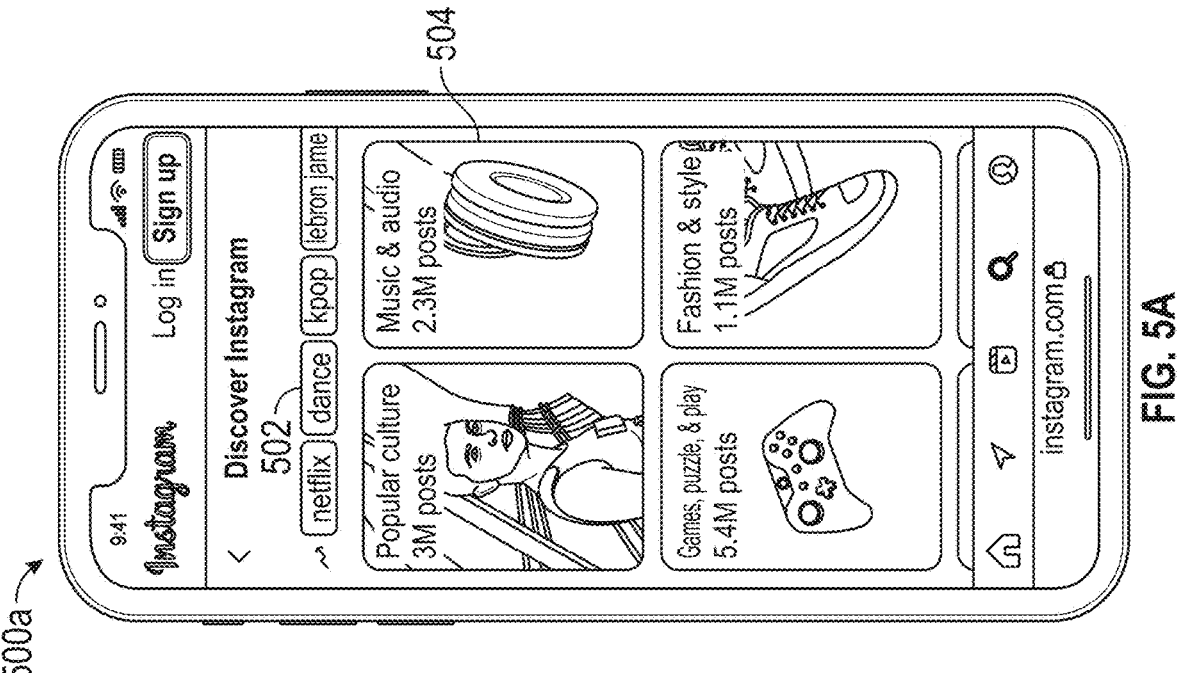
FIGS. 5A and 5B illustrate additional example interfaces for accessing content associated with a social networking system.
Figure 5B:
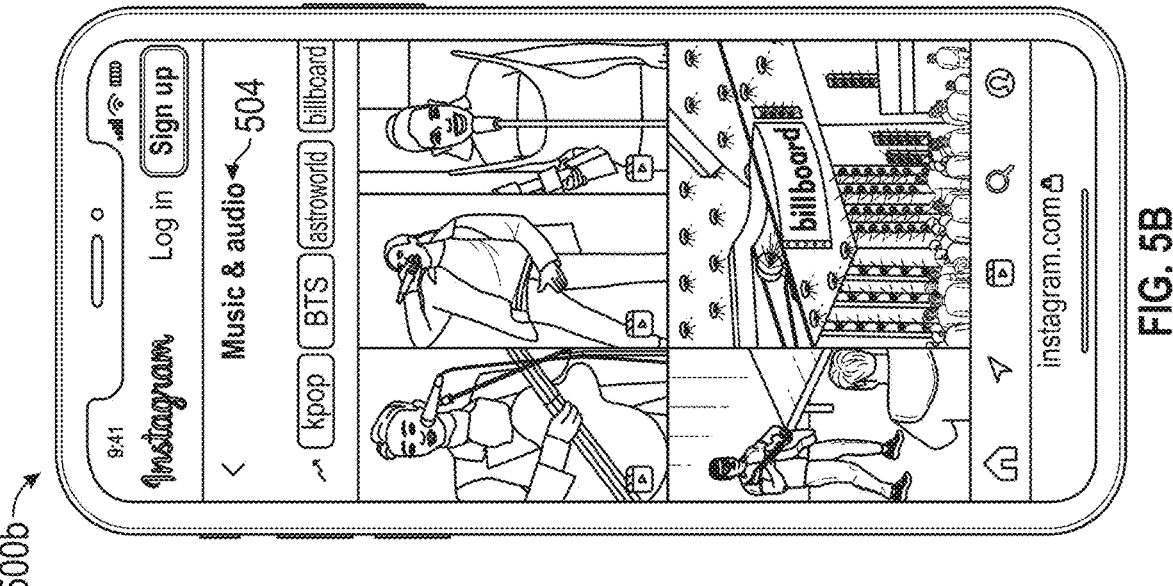

FIGS. 5A and 5B illustrate additional example interfaces for accessing content associated with a discover page of a social networking system. In some examples, the social networking system 106 may include one or more options for logged-out users to discover content via the social networking system. For example, FIG. 5A illustrates an example interface 500a which may be presented to the first user 102(1) based at least in part on the social networking system 106 receiving, via the device 104(1), an indication of a selection of the control 208. In some examples, the interface 500a may be presented to the first user 102(1) in addition to or alternative to the interface 200d, illustrated in FIG. 2D.

In some examples, the interface 500a may include one or more topics associated with content, such as topic 502, which includes the topic "dance." In some examples, interface 500a may additionally or alternatively include topics associated with categories, such as topic 504, which may include "music and audio." The topics, such as 502 and 504, may be a selectable control, such that in response to receiving an indication of a selection of the topic by a user, the social networking system 106 may cause presentation, via the device 104(1), one or more content items associated with the topic.

For example, FIG. 5B illustrates interface 500b which may be presented to the first user 102(1) based at least in part on the social networking system 106 receiving, via the device 104(1), an indication of a selection of the topic 504. For example, interface 500b may include one or more content items associated with the topic 504. The content may be from other users 102(2)-102(n) of the social networking system 106.

Figure 6A:
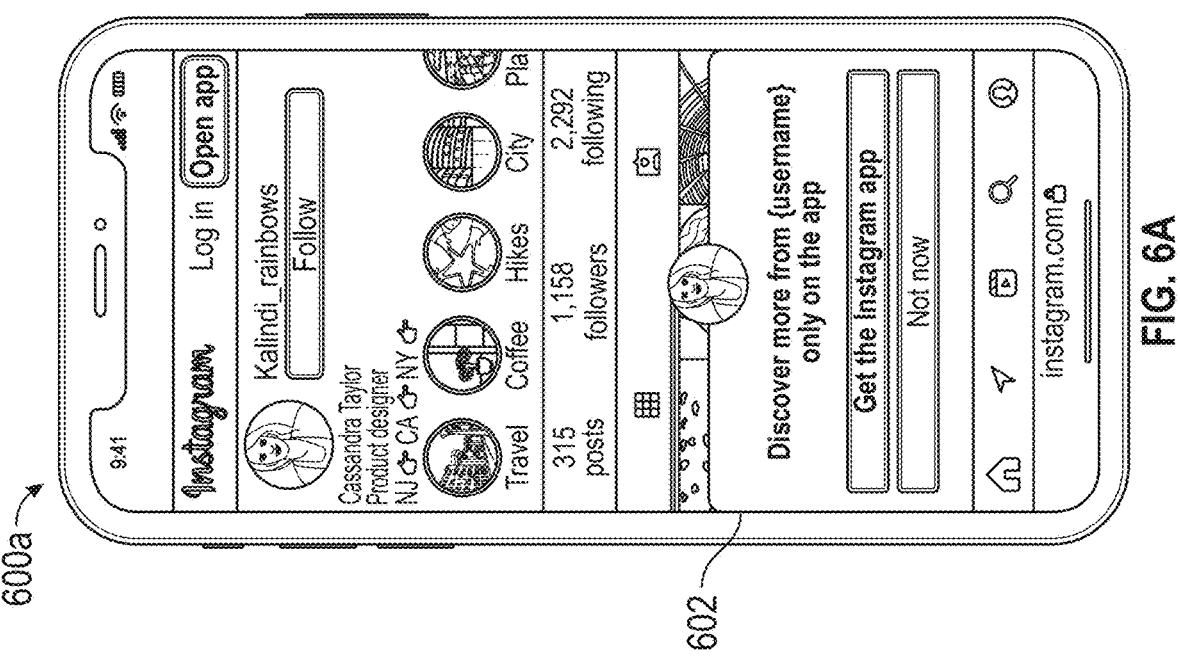
FIGS. 6A-6D illustrate additional example interfaces for accessing content associated with a social networking system.

FIGS. 6A-6D illustrate additional example interfaces for accessing content associated with a profile of a user of a social networking system 106. For example, the FIG. 6A illustrates example interface 600a which may be presented to the first user 102(1) based at least in part on the social networking system 106 receiving, via the device 104(1), an indication of a selection of a profile of another user of social networking system, such as a second user 102(2). In some examples, content associated with the profile of the second user 102(2) accessible on the interface 600a may be based at least in part on privacy settings associated with the second user 102(1), as described above with reference to FIG. 1. For example, the user 102(2), as illustrated in interface 600a, may have a public account, such that other users 102(3)-

102(n) who are not friends with the second user 102(2) may still access one or more content items associated with the second user 102(2).

In some examples, the social networking system 106 may cause presentation, visa the device 104(1), of one or more options associated with logging into and/or creating an account associated with the social networking system 106. For example, based at least in part on the social networking system 106 receiving, via the device 104(1), of an indication to access interface 600a, the social networking system 106 may determine that the first user 102(1) is not associated with the social networking system 106. The social networking system 106 may then cause presentation, via the device 104(1), of option 602, which may be the same or similar to options 212, 214, 224, 226, 302, 304, and/or 308.

In some examples, the social networking system 106 may prompt the first user 102(1) to log into an existing account or create an account associated with the social networking system 106 based at least in part on determining the first user 102(1) has accessed a threshold number of content items. For example, and similar to that described above with regard to FIG. 3D, the social networking system 106 may determine that the first user 102(1) has met or exceeded a number of threshold requests to access content, such as by selecting content associated with the second user 102(2). Based at least in part on determining that the request to access the second content item meets or exceeds the threshold number of requests for users unassociated with the social networking system 106, the social networking system 106 may refrain from presenting the second content item to the first user 102(1). For example, the social networking system 106 may cause presentation, to via the device 104(1), of one or more options associated with creating an account via the social networking system 106 such that the first user 102(1) may have full access to content associated with the social networking system 106, such as option 604, illustrated in interface 600b in FIG. 6B.

Figure 6C:
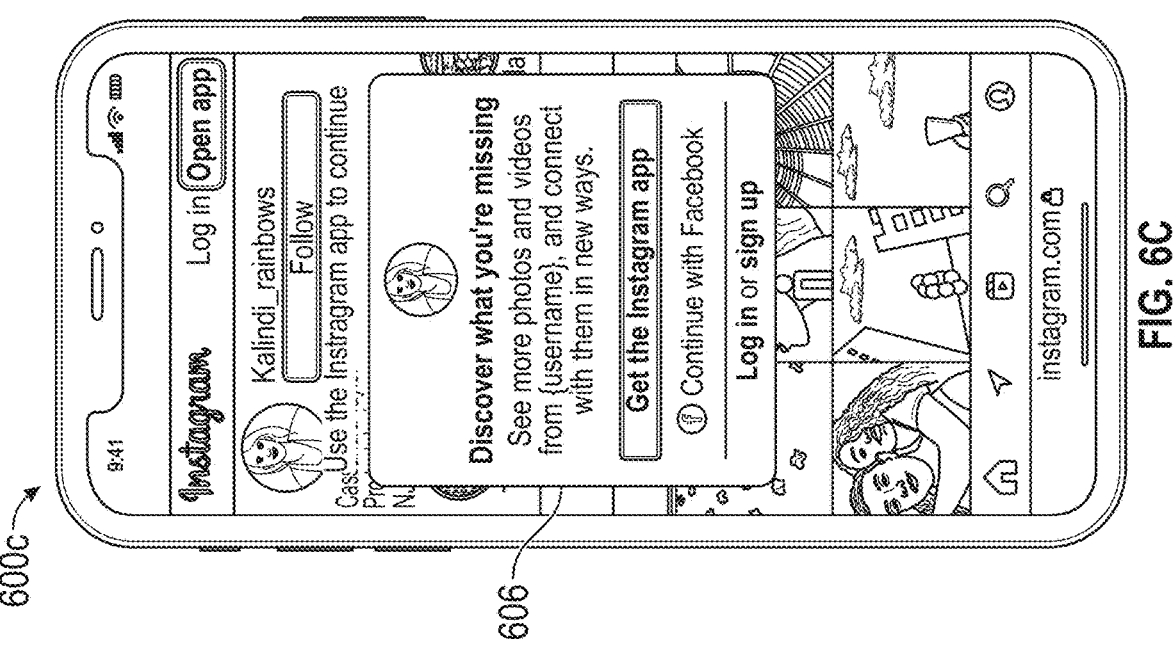
Figure 6B:
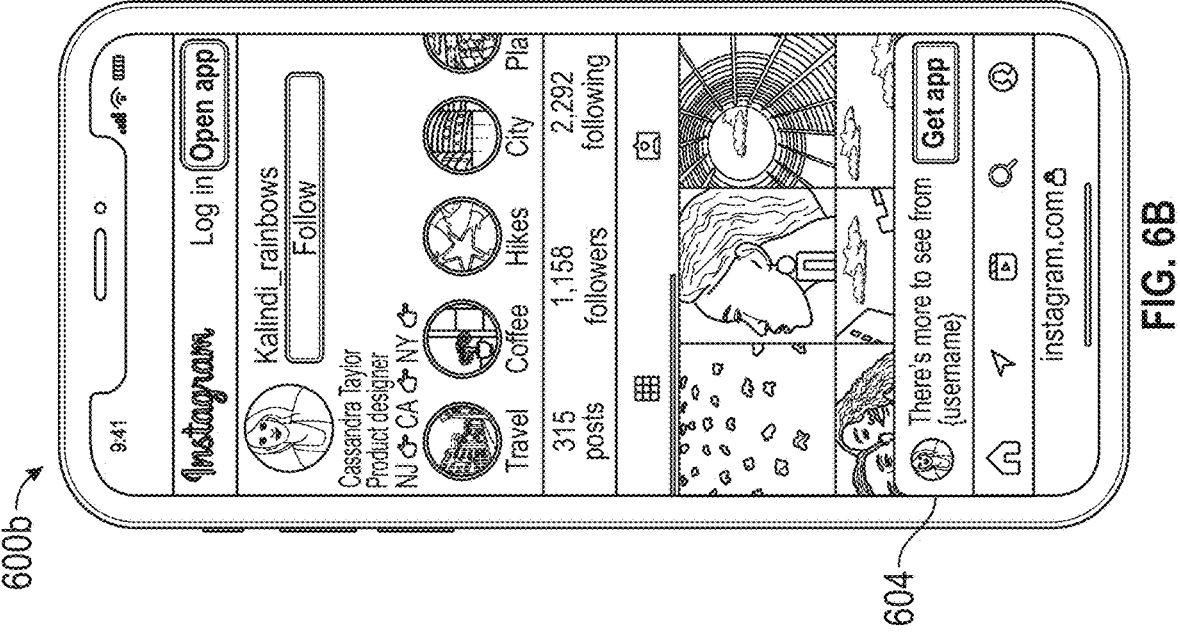

Similarly, FIG. 6C illustrates example interface 600c which includes an additional option prompting users to generate and/or log into an existing account of the social networking system 106. For example, based at least in part on the social networking system 106 receiving, via the device 104(1), an indication of a selection of a profile of a second user 102(2) associated with the social networking system 106, the social networking system 106 may cause presentation, via the device 104(1), of an option 606, which may be the same or similar to options 602 and/or 604.

Figure 6D:
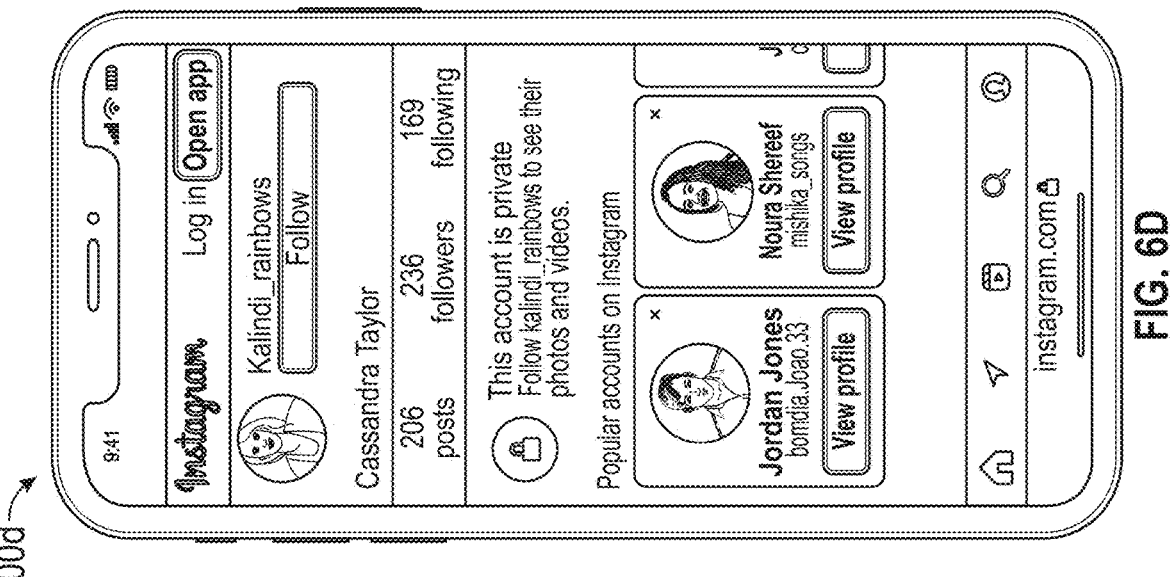

FIG. 6D illustrates example interface 600d which may be associated with private account. For example, similar to that described with respect to FIGS. 4A-C, the first user 102(1) may request to view a profile associated with a second user 102(2). In some examples, the second user 102(2) may have a private account, such that users 102(n) associated with the second user 102(2) may access content associated with the second user 102(2), whereas users unassociated with the second user 102(2) may have limited access.

Figure 7:
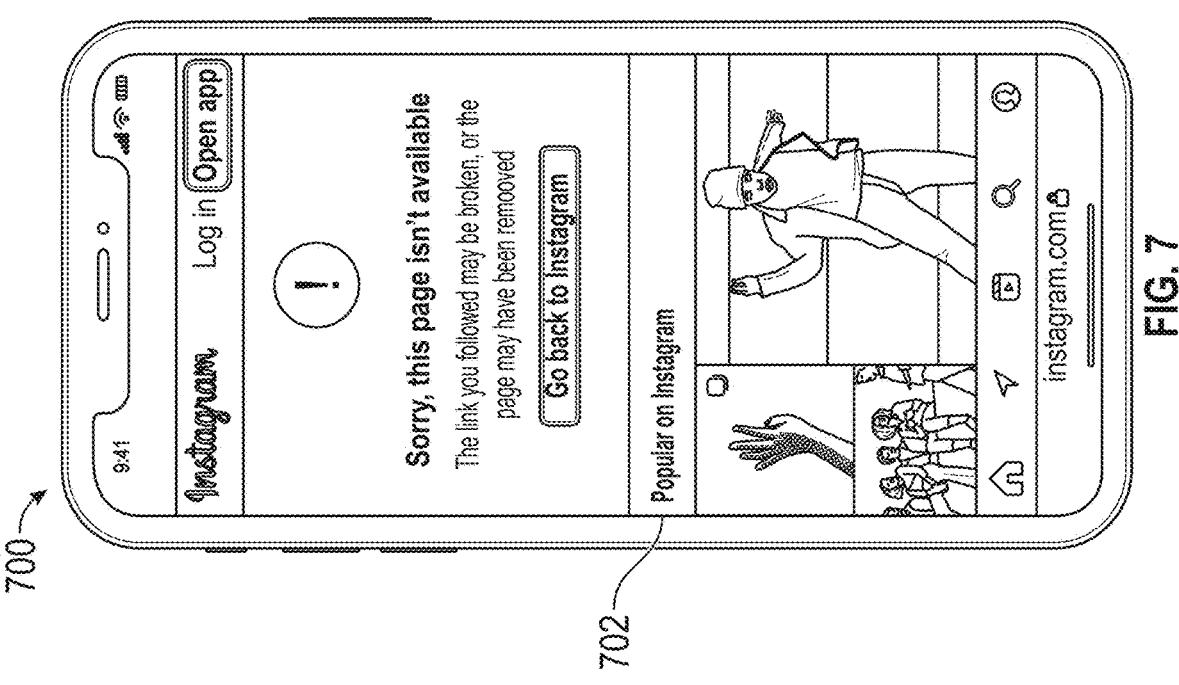
FIG. 7 illustrates an additional interface for accessing content associated with a social networking system.

FIG. 7 illustrates an additional interface 700 for accessing popular content associated with a social networking system. For example, the social networking system 106 may, in some examples, present, to the first user 102(1), one or more content items which the social networking system 106 may determine may be desirable to the first user 102(1), such as option 702. Option 702 may include one or more content items which may be popular on the social networking system 106. For example, the social networking system 106 may determine one or more content items having a highest amount of interaction, such as an amount of likes, comments, saves, or shares, for example. In some examples, the items having the highest amount of interaction may be country specific. For example, the social networking system 106 may determine the first user 102(1) is associated with a country (e.g., United States). Thus, the social networking system 106 may cause presentation of content having a highest amount of interaction, wherein that content is associated with the country. In this way, the social networking system 106 may ensure that content presented to the first user 102(1) may be relevant to the first user 102(1), such as being in a language the first user 102(1) may know.

Example Methods

Various methods are described with reference to the example system of FIG. 1 for convenience and ease of understanding. However, the methods described are not limited to being performed using the system of FIG. 1 and may be implemented using systems and devices other than those described herein.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some examples, one or more operations of the method may be omitted entirely. Moreover, the methods described herein can be combined in whole or in part with each other or with other methods.

FIG. 8 depicts an example process 800 for presenting content, via a web browser of a social networking system, to a logged-out user. For example, at operation 802, the process 800 may include at least receiving, from a user and via a web browser of a device associated with the user, a request to access a content item of a social networking system.

At operation 804, the process 800 may include at least determining, by the social networking system, that the user is unassociated with the social networking system.

At operation 806, the process 800 may include at least causing presentation, based at least in part on determining that the user is unassociated with the social networking system and via the device, of the content item. In this way, the social networking system may allow logged-out users the ability to interact with and accessing content, prior to creating an account.

FIG. 9 depicts an example process 900 for limiting content presented to a logged-out user via social networking system. For example, at operation 902, the process 900 may include at least receiving, from a user and via a web browser of a device associated with the user, a request to access a first content item of a social networking system. The social networking system may receive the request via the device associated with the user as a scroll gesture, a swipe gesture, and/or a tap gesture, to name a few examples.

At operation 904, the process 900 may include at least causing presentation, to the user and via the device, of the first content item. The first content item may include, for example, a profile or feed post, a story, a direct message to one or more other accounts, a reel, a tweet, or a snap, to name a few examples.

At operation 906, the process 900 may include at least receiving, from the user, a request to access a second content item. Similar to the first content item, the second content item may include at least a profile or feed post, a story, a direct message to one or more other accounts, a reel, a tweet, or a snap, to name a few examples.

At operation 908, the process 900 may include at least determining, by the social networking system, that the user is unassociated with the social networking system. For example, based at least in part on receiving the request to access the second content item, an account services component of the social networking system may send, to the device of the user, a request to access a token associated with login credentials of the user associated with the social networking system. Based at least in part on refraining from receiving one or more tokens, the social networking system may determine that the user is unassociated with an account on the social networking system.

At operation 910, the process 900 may include at least determining, by the social networking system, that the request to access the second content item meets or exceeds a threshold number of requests for users unassociated with the social networking system. For example, the social networking system may determine a threshold number of requests (e.g., 1 request, 5 requests, 10 requests, etc.) by the user to access the second content item. In some examples, the threshold may be a variable threshold which may be adjusted based on one or more characteristics associated with the user, the content, and/or the topic. Additionally or alternatively, the threshold number of requests may be based at least in part on a type of content, such as a profile post, a feed post, a reel, or a story, to name a few examples, wherein the first content item and the second content item include the same type of content.

At operation 912, based at least in part on determining that the request to access the second content item meets or exceeds the threshold number of requests for users unassociated with the social networking system, the process 900 may include refraining from presenting the second content item. In some examples, the social networking system may cause presentation, via a device associated with the user, of one or more options associated with creating an account via the social networking system such that the user may have full access to content associated with the social networking system.

FIG. 10 depicts an example process 1000 determining content to present to a logged-out user. For example, at operation 1002, the process 1000 may include at least receiving, from a user, a request to access a social networking system via a web browser of a device associated with the user.

At operation 1004, the process 1000 may include at least determining that the user is unassociated with the social networking system. For example, and similar to operation 910 in FIG. 9, based at least in part on receiving the request to access the second content item, an account services component of the social networking system may send, to the device of the user, a request to access a token associated with login credentials of the user associated with the social networking system. Based at least in part on refraining from receiving one or more tokens, the social networking system may determine that the user is unassociated with an account on the social networking system.

At operation 1006, the process 1000 may include at least causing presentation, to the user, of a suggested content item associated with a topic. For example, the social networking system may cause presentation, via the device associated with the user, a prompt associated with selecting the suggested content item. For example, the prompt may be an indication to the user, that by selecting one or more suggested content items, the social networking system may gather information about the user's preferences, likes, and/or dislikes, allowing the social networking system to curate content to the user.

At operation 1008, the process 1000 may include receiving, from the user, a selection of the suggested content item. For example, the user may select the suggested content item, indicating the topic associated with the suggested content item may be of interest to the user.

At operation 1010, the process 1000 may include causing presentation, based at least in part in receiving the selection of the suggested content item and to the user, of a content item associated with the topic.

Example System and Device

Figure 11:
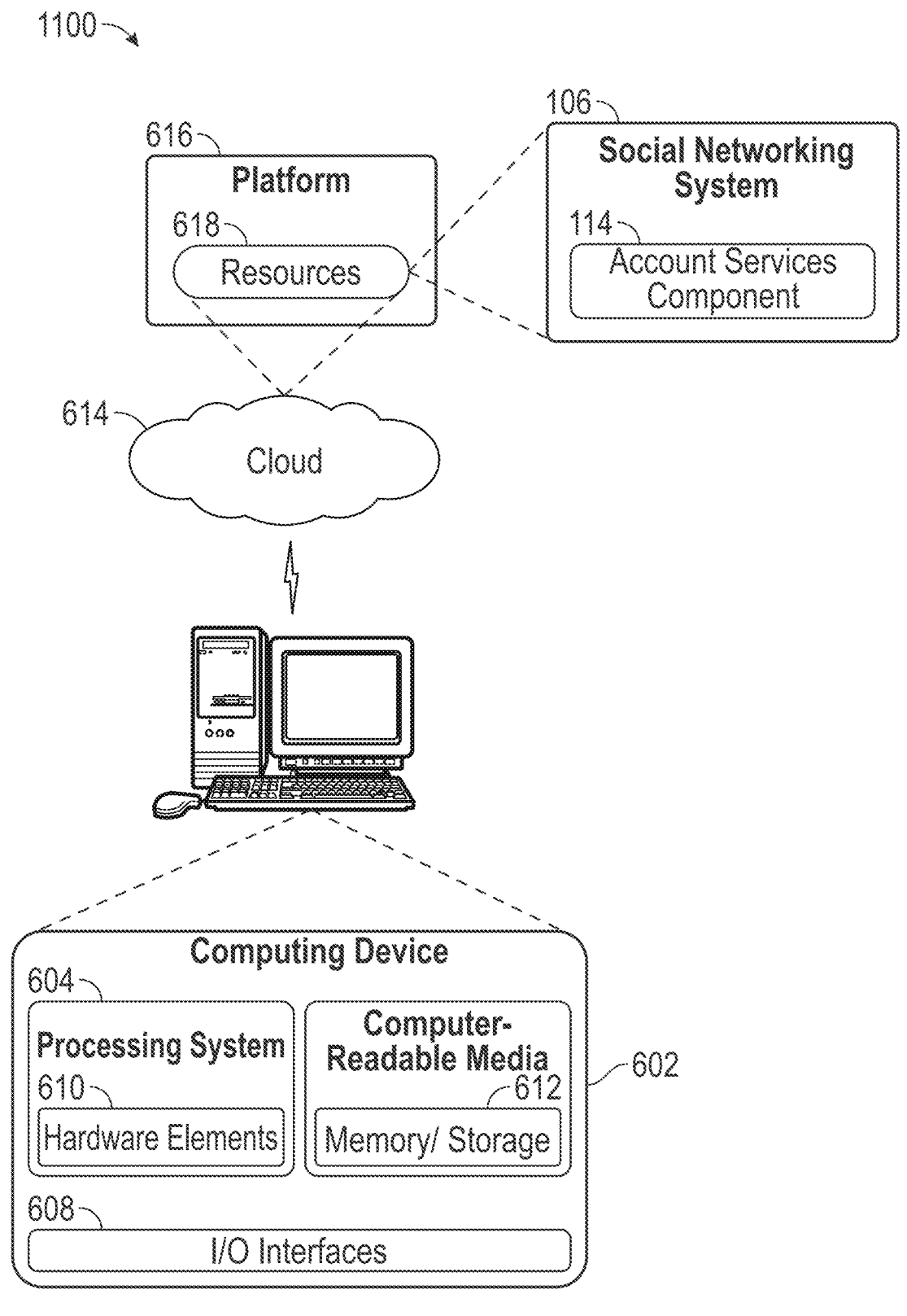
FIG. 11 illustrates an example system and device which may be used to implement the techniques described herein.

FIG. 11 illustrates an example system generally at 1100 that includes an example computing device 1102 that is representative of one or more computing systems and/or devices that may implement the various techniques described herein. The computing device 1102 may be, for example, a server of a service provider, a device associated with a client (e.g., a client device), an on-chip system, and/or any other suitable computing device or computing system.

The example computing device 1102 as illustrated includes a processing system 1104, one or more computer-readable media 1106, and one or more I/O interface 1108 that are communicatively coupled, one to another. Although not shown, the computing device 1102 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware elements 1110 that may be configured as processors, functional blocks, and so forth. This may include implementation in hardware as an application specific integrated circuit or other logic device formed using one or more semiconductors. The hardware elements 1110 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1106 is illustrated as including memory/storage component 1112. The memory/storage component 1112 represents memory/storage capacity associated with one or more computer-readable media. The memory/storage component 1112 may include volatile media (such as random access memory (RAM)) and/or nonvolatile media (such as read only memory (ROM), Flash memory, optical disks, magnetic disks, and so forth). The memory/storage component 1112 may include fixed media (e.g., RAM, ROM, a fixed hard drive, and so on) as well as removable media (e.g., Flash memory, a removable hard drive, an optical disc, and so forth). The computer-readable media 1106 may be configured in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1102 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," "logic," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on and/or transmitted across some form of computer-readable media. The computer-readable media may include a variety of media that may be accessed by the computing device 1102. By way of example, and not limitation, computer-readable media may include "computer-readable storage media" and "computer-readable transmission media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer-readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable transmission media" may refer to a medium that is configured to transmit instructions to the hardware of the computing device 1102, such as via a network. Computer-readable transmission media typically may transmit computer-readable instructions, data structures, program modules, or other data in a modulated data signal, such as carrier waves, data signals, or other transport mechanism. Computer-readable transmission media also include any information delivery media. The term "modulated data signal" means a signal that has one or more of its characteristics set or changed in such a manner as to encode information in the signal. By way of example, and not limitation, computer-readable transmission media include wired media such as a wired network or direct-wired connection, and wireless media such as acoustic, radio frequency (RF), infrared, and other wireless media.

As previously described, hardware elements 1110 and computer-readable media 1106 are representative of modules, programmable device logic and/or device logic implemented in a hardware form that may be employed in some examples to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1110. The computing device 1102 may be configured to implement particular instructions and/or functions corresponding to the software and/or hardware modules. Accordingly, implementation of a module that is executable by the computing device 1102 as software may be achieved at least partially in hardware, e.g., through use of computer-readable storage media and/or hardware elements 1110 of the processing system 1104. The instructions and/or functions may be executable/operable by one or more articles of manufacture (for example, one or more computing devices 1102 and/or processing systems 1104) to implement techniques, modules, and examples described herein.

The techniques described herein may be supported by various configurations of the computing device 1102 and are not limited to the specific examples of the techniques described herein. This functionality may also be implemented all or in part through use of a distributed system, such as over a "cloud" 1114 via a platform 1116 as described below.

The cloud 1114 includes and/or is representative of a platform 1116 for resources 1118. The platform 1116 abstracts underlying functionality of hardware (e.g., servers) and software resources of the cloud 1114. The resources 1118 may include applications and/or data that can be utilized while computer processing is executed on servers that are remote from the computing device 1102. Resources 1118 can also include services provided over the Internet and/or through a subscriber network, such as a cellular or Wi-Fi network.

The platform 1116 may abstract resources and functions to connect the computing device 1102 with other computing devices. The platform 1116 may also be scalable to provide a corresponding level of scale to encountered demand for the resources 1118 that are implemented via the platform 1116. Accordingly, in an interconnected device embodiment, implementation of functionality described herein may be distributed throughout multiple devices of the system 1100.

For example, the functionality may be implemented in part on the computing device 1102 as well as via the platform 1116 which may represent a cloud computing environment or "cloud" 1114.

The example systems and methods of the present disclosure overcome various deficiencies of known prior art devices. Other examples of the present disclosure will be apparent to those skilled in the art from consideration of the specification and practice of the disclosure contained herein. It is intended that the specification and examples be considered as example only, with a true scope and spirit of the present disclosure being indicated by the following claims.

The example systems and methods of the present disclosure overcome various deficiencies of known prior art devices. Other examples of the present disclosure will be apparent to those skilled in the art from consideration of the specification and practice of the disclosure contained herein. It is intended that the specification and examples be considered as example only, with a true scope and spirit of the present disclosure being indicated by the following claims.

CONCLUSION

Although the discussion above sets forth example implementations of the described techniques, other architectures may be used to implement the described functionality, and are intended to be within the scope of this disclosure. Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

Example Clauses

Clause 1. A method comprising: receiving, from a device associated with a user, a request to access a content item of a social networking system; determining that the user is unassociated with the social networking system; and causing presentation of the content item via the device based at least in part on determining that the user is unassociated with the social networking system.

Clause 2. The method of clause 1, wherein determining that the user is unassociated with the social networking system includes determining that the user is unassociated with a first platform associated with the social networking system, the method further comprising: determining that the user is associated with a second platform of the social networking system; causing presentation, via the device, of one or more options to send data associated with the user on the second platform to the first platform; receiving, from the device, an indication to send the data from the second platform to the first platform; and sending data associated with the user from the second platform to the first platform.

Clause 3. The method of clause 1 or 2, further comprising: causing presentation, via the device, of one or more options associated with creating a temporary account on the social networking system; receiving, from the device, an indication to create a temporary account associated with the social networking system; and generating a temporary account associated with the user for the social networking system, wherein the temporary account is associated with an amount of time.

Clause 4. The method of clause 3, further comprising: determining the amount of time has elapsed; and terminating the temporary account associated with the user for the social networking system.

Clause 5. The method of clause 3, further comprising: determining the amount of time has elapsed; causing presentation, via the device, of one or more options associated with creating a permanent account of the social networking system; receiving, via the device, an indication to create a permanent account associated with the user for the social networking system; and generating the permanent account associated with the user for the social networking system, wherein generating the permanent account comprises removing the amount of time from the temporary account.

Clause 6. The method of any of clauses 1-5, wherein the content item is a first content item, the method further comprising: receiving, via the device, a request to access a second content item; determining that the request to access the second content item meets or exceeds a threshold number of requests for the user unassociated with the social networking system; and refraining from presenting the second content item based at least in part on determining that the request to access the second content item meets or exceeds the threshold number of requests for the user unassociated with the social networking system.

Clause 7. A system comprising: one or more processors; and computer-readable media storing instructions that, when executed by the one or more processors, cause the system to perform operations comprising: receiving, from a device associated with a user, a request to access a first content item of a social networking system; causing presentation, via the device, of the first content item; receiving, from the device, a request to access a second content item; determining that the user is unassociated with the social networking system; determining that the request to access the second content item meets or exceeds a threshold number of requests for the user unassociated with the social networking system; and refraining from presenting the second content item based at least in part on determining that the request to access the second content item meets or exceeds the threshold number of requests for the user unassociated with the social networking system.

Clause 8. The system of clause 7, wherein determining that the user is unassociated with the social networking system includes determining that the user is unassociated with a first platform associated with the social networking system, the operations further comprising: determining that the user is associated with a second platform of the social networking system; causing presentation, via the device, of one or more options to send data associated with the user on the second platform to the first platform; receiving, from the device, an indication to send the data from the second platform to the first platform; and sending data associated with the user from the second platform to the first platform.

Clause 9. The system of clause 7 or 8, the operations further comprising: causing presentation, via the device, of one or more options associated with creating a temporary account on the social networking system; receiving, from the device, an indication to create a temporary account associated with the social networking system; and generating a temporary account associated with the user for the social networking system, wherein the temporary account is associated with an amount of time.

Clause 10. The system of clause 9, the operations further comprising: determining the amount of time has elapsed; and terminating the temporary account associated with the user for the social networking system.

Clause 11. The system of clause 9, the operations further comprising: determining the amount of time has elapsed; causing presentation, to the user, of one or more options associated with creating a permanent account associated with the user for the social networking system; receiving, from the device, an indication to create a permanent account associated with the user for the social networking system; and generating the permanent account associated with the user for the social networking system, wherein generating the permanent account comprises removing the amount of time from the temporary account.

Clause 12. One or more non-transitory computer-readable media storing instructions that, when executed by one or more processors of a server computing device, cause the server computing device to perform operations comprising: receiving, from a device associated with a user, a request to access a social networking system; determining that the user is unassociated with the social networking system; causing presentation, via the device, of a suggested content item associated with a topic; receiving, from the device, a selection of the suggested content item; and causing presentation of a content item associated with the topic based at least in part on receiving the selection of the suggested content item.

Clause 13. The one or more non-transitory computer-readable media of clause 12, wherein determining that the user is unassociated with the social networking system includes determining that the user is unassociated with a first platform associated with the social networking system, the operations further comprising: determining that the user is associated with a second platform of the social networking system; causing presentation, via the device, of one or more options to send data associated with the user on the second platform to the first platform; receiving, from the device, an indication to send the data from the second platform to the first platform; and sending data associated with the user from the second platform to the first platform.

Clause 14. The one or more non-transitory computer-readable media of clause 12 or 13, the operations further comprising: causing presentation, via the device, of one or more options associated with creating a temporary account on the social networking system; receiving, from the device, an indication to create a temporary account associated with the user for the social networking system; and generating a temporary account associated with the user for the social networking system, wherein the temporary account is associated with an amount of time.

Clause 15. The one or more non-transitory computer-readable media of clause 14, the operations further comprising: determining the amount of time has elapsed; and terminating the temporary account associated with the user for the social networking system.

Clause 16. The one or more non-transitory computer-readable media of clause 14, the operations further comprising: determining the amount of time has elapsed; causing presentation, via the device, of one or more options associated with creating a permanent account of the social networking system; receiving, from the user, an indication to create a permanent account associated with the user for the social networking system; and generating the permanent account associated with the user for the social networking system, wherein generating the permanent account comprises removing the amount of time from the temporary account.

Clause 17. The one or more non-transitory computer-readable media of any of clauses 12-16, wherein the content item is a first content item, the operations further comprising: receiving, from the device, a request to access a second content item; determining that the request to access the second content item meets or exceeds a threshold number of requests for the user unassociated with the social networking system; and refraining from presenting the second content item based at least in part on determining that the request to access second content item meets or exceeds the threshold number of requests for the user unassociated with the social networking system.

Clause 18. A method comprising: receiving, via a web browser from a device associated with a user, a request to access a content item of a social networking system; determining that the device is unassociated with the social networking system; and causing presentation of the content item via the device based at least in part on determining that the device is unassociated with the social networking system.

Clause 19. The method of clause 18, wherein determining that the device is unassociated with the social networking system includes determining that the device is unassociated with a first platform associated with the social networking system, the method further comprising: determining that the device is associated with a second platform of the social networking system; causing presentation, via the device, of one or more options to send data associated with the device on the second platform to the first platform; receiving, from the device, an indication to send the data from the second platform to the first platform; and sending data associated with the device from the second platform to the first platform.

Clause 20. The method of clause 18 or 19, further comprising: causing presentation, via the device, of one or more options associated with creating a temporary account on the social networking system; receiving, from the device, an indication to create a temporary account associated with the social networking system; and generating a temporary account associated with the device for the social networking system, wherein the temporary account is associated with an amount of time.

Clause 21. The method of clause 20, further comprising: determining the amount of time has elapsed; and terminating the temporary account associated with the device for the social networking system.

Clause 22. The method of clause 20, further comprising: determining the amount of time has elapsed; causing presentation, via the device, of one or more options associated with creating a permanent account of the social networking system; receiving, via the device, an indication to create a permanent account associated with the device for the social networking system; and generating the permanent account associated with the device for the social networking system, wherein generating the permanent account comprises removing the amount of time from the temporary account.

Clause 23. The method of any of clauses 19-22, wherein the content item is a first content item, the method further comprising: receiving, via the device, a request to access a second content item; determining that the request to access the second content item meets or exceeds a threshold number of requests for the device unassociated with the social networking system; and refraining from presenting the second content item based at least in part on determining that the request to access the second content item meets or exceeds the threshold number of requests for the device unassociated with the social networking system.

What is claimed is:

1. A method comprising:
receiving, from a device associated with a user, a request to access a first content item of a social networking system;
determining that the user is unassociated with the social networking system;
causing presentation of the first content item via the device based at least in part on determining that the user is unassociated with the social networking system;
receiving, via the device, a request to access a second content item;
determining that the request to access the second content item meets or exceeds a threshold number of requests for the user unassociated with the social networking system, wherein the threshold number of requests is based at least in part on a type of the second content; and
preventing presentation of the second content item based at least in part on determining that the request to access the second content item meets or exceeds the threshold number of requests for the user unassociated with the social networking system.

2. The method of claim 1, wherein determining that the user is unassociated with the social networking system includes determining that the user is unassociated with a first platform associated with the social networking system, the method further comprising:
determining that the user is associated with a second platform of the social networking system;
causing presentation, via the device, of one or more options to send data associated with the user on the second platform to the first platform;
receiving, from the device, an indication to send the data from the second platform to the first platform; and
sending data associated with the user from the second platform to the first platform.

3. The method of claim 1, further comprising:
causing presentation, via the device, of one or more options associated with creating a temporary account on the social networking system;
receiving, from the device, an indication to create a temporary account associated with the social networking system; and
generating a temporary account associated with the user for the social networking system, wherein the temporary account is associated with an amount of time.

4. The method of claim 3, further comprising:
determining the amount of time has elapsed; and
terminating the temporary account associated with the user for the social networking system.

5. The method of claim 3, further comprising:
determining the amount of time has elapsed;
causing presentation, via the device, of one or more options associated with creating a permanent account of the social networking system;
receiving, via the device, an indication to create a permanent account associated with the user for the social networking system; and
generating the permanent account associated with the user for the social networking system, wherein generating the permanent account comprises removing the amount of time from the temporary account.

6. A system comprising:
one or more processors; and
computer-readable media storing instructions that, when executed by the one or more processors, cause the system to perform operations comprising:

receiving, from a device associated with a user, a request to access a first content item of a social networking system;

causing presentation, via the device, of the first content item;

receiving, from the device, a request to access a second content item;

determining that the user is unassociated with the social networking system;

determining that the request to access the second content item meets or exceeds a threshold number of requests for the user unassociated with the social networking system, wherein the threshold number of requests is based at least in part on a type of the second content; and refraining from presenting the second content item based at least in part on determining that the request to access the second content item meets or exceeds the threshold number of requests for the user unassociated with the social networking system.

7. The system of claim 6, wherein determining that the user is unassociated with the social networking system includes determining that the user is unassociated with a first platform associated with the social networking system, the operations further comprising:

determining that the user is associated with a second platform of the social networking system;

causing presentation, via the device, of one or more options to send data associated with the user on the second platform to the first platform;

receiving, from the device, an indication to send the data from the second platform to the first platform; and sending data associated with the user from the second platform to the first platform.

8. The system of claim 6, the operations further comprising:

causing presentation, via the device, of one or more options associated with creating a temporary account on the social networking system;

receiving, from the device, an indication to create a temporary account associated with the social networking system; and generating a temporary account associated with the user for the social networking system, wherein the temporary account is associated with an amount of time.

9. The system of claim 8, the operations further comprising:

determining the amount of time has elapsed; and terminating the temporary account associated with the user for the social networking system.

10. The system of claim 8, the operations further comprising:

determining the amount of time has elapsed;

causing presentation, to the user, of one or more options associated with creating a permanent account associated with the user for the social networking system;

receiving, from the device, an indication to create a permanent account associated with the user for the social networking system; and generating the permanent account associated with the user for the social networking system, wherein generating the permanent account comprises removing the amount of time from the temporary account.

11. One or more non-transitory computer-readable media storing instructions that, when executed by one or more processors of a server computing device, cause the server computing device to perform operations comprising:

receiving, from a device associated with a user, a request to access a social networking system;

determining that the user is unassociated with the social networking system;

causing presentation, via the device, of a suggested content item associated with a topic;

receiving, from the device, a selection of the suggested content item; and causing presentation of a content item associated with the topic based at least in part on receiving the selection of the suggested content item.

12. The one or more non-transitory computer-readable media of claim 11, wherein determining that the user is unassociated with the social networking system includes determining that the user is unassociated with a first platform associated with the social networking system, the operations further comprising:

determining that the user is associated with a second platform of the social networking system;

causing presentation, via the device, of one or more options to send data associated with the user on the second platform to the first platform;

receiving, from the device, an indication to send the data from the second platform to the first platform; and sending data associated with the user from the second platform to the first platform.

13. The one or more non-transitory computer-readable media of claim 12, wherein the content item is a first content item, the operations further comprising:

receiving, from the device, a request to access a second content item;

determining that the request to access the second content item meets or exceeds a threshold number of requests for the user unassociated with the social networking system; and refraining from presenting the second content item based at least in part on determining that the request to access second content item meets or exceeds the threshold number of requests for the user unassociated with the social networking system.

14. The one or more non-transitory computer-readable media of claim 11, wherein the content item is a first content item, the operations further comprising:

receiving, from the device, a request to access a second content item;

determining that the request to access the second content item meets or exceeds a threshold number of requests for the user unassociated with the social networking system; and refraining from presenting the second content item based at least in part on determining that the request to access second content item meets or exceeds the threshold number of requests for the user unassociated with the social networking system.

15. The one or more non-transitory computer-readable media of claim 11, the operations further comprising:

causing presentation, via the device, of one or more options associated with creating a temporary account on the social networking system;

receiving, from the device, an indication to create a temporary account associated with the user for the social networking system; and generating a temporary account associated with the user for the social networking system, wherein the temporary account is associated with an amount of time.

16. The one or more non-transitory computer-readable media of claim 15, the operations further comprising:

determining the amount of time has elapsed;

causing presentation, via the device, of one or more options associated with creating a permanent account of the social networking system;

receiving, from the user, an indication to create a permanent account associated with the user for the social networking system; and generating the permanent account associated with the user for the social networking system, wherein generating the permanent account comprises removing the amount of time from the temporary account.

17. The one or more non-transitory computer-readable media of claim 15, wherein the content item is a first content item, the operations further comprising:

receiving, from the device, a request to access a second content item;

determining that the request to access the second content item meets or exceeds a threshold number of requests for the user unassociated with the social networking system; and refraining from presenting the second content item based at least in part on determining that the request to access second content item meets or exceeds the threshold number of requests for the user unassociated with the social networking system.

18. The one or more non-transitory computer-readable media of claim 15, the operations further comprising:

determining the amount of time has elapsed; and terminating the temporary account associated with the user for the social networking system.

19. The one or more non-transitory computer-readable media of claim 18, wherein the content item is a first content item, the operations further comprising:

receiving, from the device, a request to access a second content item;

determining that the request to access the second content item meets or exceeds a threshold number of requests for the user unassociated with the social networking system; and refraining from presenting the second content item based at least in part on determining that the request to access second content item meets or exceeds the threshold number of requests for the user unassociated with the social networking system.

* * * * *